United States Patent
Yabu et al.

(10) Patent No.: US 11,772,084 B2
(45) Date of Patent: Oct. 3, 2023

(54) CATALYST, LIQUID COMPOSITION, ELECTRODE, CATALYST ELECTRODE FOR ELECTROCHEMICAL REACTION, FUEL CELL, AND AIR BATTERY

(71) Applicant: Azul Energy Inc., Miyagi (JP)

(72) Inventors: Hiroshi Yabu, Sendai (JP); Tomokazu Matsue, Sendai (JP); Akichika Kumatani, Sendai (JP); Hiroya Abe, Sendai (JP); Yutaro Hirai, Sendai (JP); Kohei Nozaki, Sendai (JP)

(73) Assignee: Azul Energy Inc., Miyagi (JP)

( * ) Notice: Subject to any disclaimer, the term of this patent is extended or adjusted under 35 U.S.C. 154(b) by 153 days.

(21) Appl. No.: 16/976,283

(22) PCT Filed: Dec. 26, 2018

(86) PCT No.: PCT/JP2018/047829
§ 371 (c)(1),
(2) Date: Nov. 3, 2020

(87) PCT Pub. No.: WO2019/167407
PCT Pub. Date: Sep. 6, 2019

(65) Prior Publication Data
US 2021/0308659 A1 Oct. 7, 2021

(30) Foreign Application Priority Data

Mar. 2, 2018 (JP) .............................. JP2018-037521

(51) Int. Cl.
*H01M 4/90* (2006.01)
*B01J 31/18* (2006.01)
*H01M 12/08* (2006.01)

(52) U.S. Cl.
CPC ......... *B01J 31/183* (2013.01); *H01M 4/9008* (2013.01); *H01M 4/9083* (2013.01); *H01M 12/08* (2013.01); *B01J 2531/842* (2013.01)

(58) Field of Classification Search
CPC .. B01J 2531/842; B01J 31/183; H01M 12/08; H01M 2008/1095; H01M 4/8652;
(Continued)

(56) References Cited

U.S. PATENT DOCUMENTS

| | | |
|---|---|---|
| 2007/0243449 A1 | 10/2007 | Sotomura et al. |
| 2017/0092958 A1 | 3/2017 | Zimmerman et al. |
| 2017/0110719 A1* | 4/2017 | Wang ............... H01G 11/36 |

FOREIGN PATENT DOCUMENTS

| | | |
|---|---|---|
| CN | 101417242 A | 4/2009 |
| EP | 0512713 A1 | 11/1992 |

(Continued)

OTHER PUBLICATIONS

European Patent Office, Search Report issued in EP 18908102.9 dated Nov. 3, 2021.

(Continued)

*Primary Examiner* — Victoria H Lynch
(74) *Attorney, Agent, or Firm* — Wood Herron & Evans LLP

(57) ABSTRACT

The present invention provides a catalyst which has oxygen reduction catalytic ability surpassing that of a platinum-carrying carbon material. This catalyst comprises a carbon material and a metal complex represented by formula (1).

(Continued)

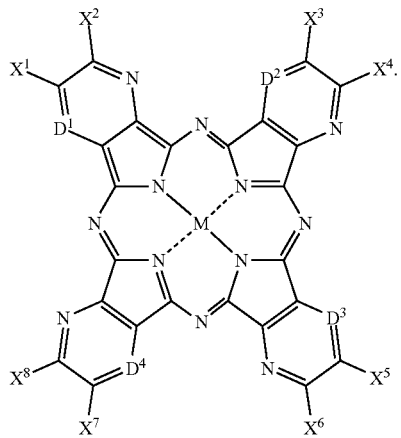

(1)

In formula (1), $X^1$ to $X^8$ each independently represent a hydrogen atom or a halogen atom, $D^1$ to $D^4$ each represent a nitrogen atom or a carbon atom wherein the carbon atom has bound thereto a hydrogen atom or a halogen atom, and M represents a metallic atom.

8 Claims, 26 Drawing Sheets

(58) Field of Classification Search
CPC .... H01M 4/9008; H01M 4/9083; H01M 4/96; H01M 8/10; Y02E 60/50
See application file for complete search history.

(56) References Cited

FOREIGN PATENT DOCUMENTS

| JP | S58186169 A | 10/1983 |
|---|---|---|
| JP | 2008311048 A | 12/2008 |
| JP | 2014091061 A | 5/2014 |
| JP | 2016085925 A | 5/2016 |
| WO | 2007023964 A1 | 3/2007 |
| WO | 2011031539 A2 | 3/2011 |

OTHER PUBLICATIONS

Xu, Zhanwei, et al., Electrochemical performance of carbon nanotube-supported cobalt phthalocyanine and its nitrogen-rich derivatives for oxygen reduction, Journal of Molecular Catalysis A: Chemical, 2011, vol. 335, pp. 89 to 96.
Tanaka. A. A, et al., Oxygen reduction on adsorbed iron tetrapyridinoporphyrazine, Materials chemistry and physics, 1989, vol. 22, pp. 431 to 456.
PCT Office, International Search Report issued in PCT/JP2018/047829 dated Mar. 26, 2019.
Sen Liu, et al., Electrochemical performance of iron and cobalt tetrapyrazinoporphyrazines supported on multiwalled carbon nantubes, Advanced Materials Research, ISSN: 1662-8985, vols. 634-638, pp. 2155-2159, (2013), doi: 10.4028/www.scientific.net/AMR.634-638.2155.
Korean Office Action, Office Action issued in KR 10-2020-7028212 dated May 17, 2022.
Chinese Patent Office, Office Action issued in CN 201880091934.7 dated Oct. 19, 2022.

* cited by examiner

CATALYST, LIQUID COMPOSITION, ELECTRODE, CATALYST ELECTRODE FOR ELECTROCHEMICAL REACTION, FUEL CELL, AND AIR BATTERY

TECHNICAL FIELD

The present invention relates to a catalyst, a liquid composition, an electrode, a catalyst electrode for electrochemical reaction, a fuel cell, and an air battery.

Priority is claimed on Japanese Patent Application No. 2018-037521, filed Mar. 2, 2018, the content of which is incorporated herein by reference.

BACKGROUND ART

Fuel cells are known which utilize a reduction reaction of oxygen to produce electrical energy. In the fuel cells, it is common to provide, on the surface of an electrode, a layer of a catalyst for promoting the reduction reaction. As such a catalyst, a platinum-carrying carbon material is known. The platinum-carrying carbon material has a superior function of promoting the reduction reaction of oxygen (oxygen reduction catalytic ability).

However, since platinum is expensive and there is a limited amount of resources therefor, attempts have been made to develop alternative catalysts that are inexpensive and for which there is an abundant amount of resources (Patent Literatures 1 to 4).

Patent Literature 1 discloses an air electrode catalyst that includes an oxygen reduction catalyst and a cocatalyst, in which the cocatalyst is a carbon material that contains 2% by mass or more of heteroatoms capable of coordination.

Patent Literature 2 discloses a method for producing an iron phthalocyanine/graphene nanocomposite oxygen reduction catalyst, the method comprising a step of mixing a graphene oxide dispersion with an iron phthalocyanine dispersion to obtain an iron phthalocyanine/graphene oxide composite, and a step of reducing the iron phthalocyanine/graphene oxide composite.

Patent Literature 3 discloses an electrode catalyst that consists of a catalyst component and a catalyst-carrying material, in which the catalyst component includes a conductive polymer-metal complex that consists of a conductive polymer and a metal ion, the conductive polymer having at least one repeating unit structure selected from the group consisting of indole, isoindole, naphthopyrrole, pyrrolopyridine, benzimidazole, purine, carbazole, phenoxazine, and phenothiazine; and the catalyst-carrying material includes a conductor having a pore structure.

Patent Literature 4 discloses an electrode for oxygen reduction which includes, as a catalyst component, a cobalt tetrapyrazinoporphyrazine derivative represented by formula (5).

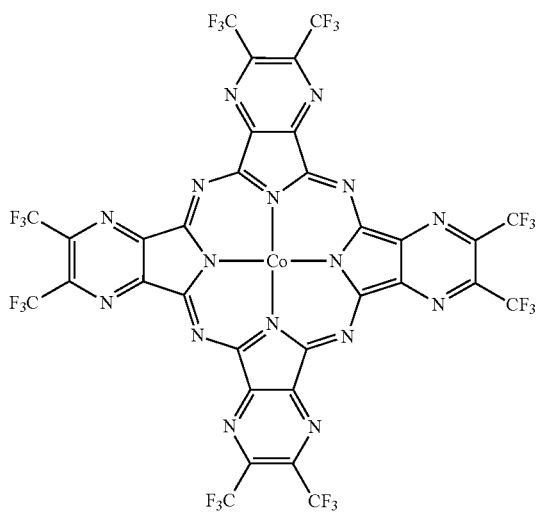

(5)

However, the techniques described in Patent Literatures 1 to 4 do not make it possible to obtain a catalyst having oxygen reduction catalytic ability surpassing that of a platinum-carrying carbon material.

In the techniques described in Patent Literatures 1 and 2, iron phthalocyanine having superior conductivity is used to ensure conductivity. However, iron phthalocyanine has low solubility in various solvents and has a restriction on the upper limit of content thereof in a catalyst. Therefore, the low solubility of iron phthalocyanine may limit an improvement in oxygen reduction catalytic ability.

For the electrode catalyst described in Patent Literature 3, the manufacturing process thereof requires polymerization of the conductive polymer, and thus it is hard to say that the electrode catalyst is an electrode catalyst which can be easily obtained.

For the electrode for oxygen reduction described in Patent Literature 4, a trifluoromethyl group is bound to the pyrazine that constitutes the cobalt tetrapyrazinoporphyrazine derivative, and thus a decrease in oxygen reduction catalytic ability may occur.

CITATION LIST

Patent Literature

[Patent Literature 1] Japanese Unexamined Patent Application, First Publication No. 2016-85925
[Patent Literature 2] Japanese Unexamined Patent Application, First Publication No. 2014-91061
[Patent Literature 3] Japanese Unexamined Patent Application, First Publication No. 2008-311048
[Patent Literature 4] Republished Japanese Translation No. WO 2007/023964 of the PCT International Publication for Patent Applications

SUMMARY OF INVENTION

Technical Problem

An object of the present invention is to provide a catalyst which has oxygen reduction catalytic ability surpassing that of a platinum-carrying carbon material.

Solution to Problem

As a result of intensive studies, the present inventors have found that applying, to a catalyst, a metal complex having a specific chemical structure and relatively low conductivity is surprisingly effective in achieving the aforementioned object. Specifically, the present inventors have found that a catalyst, which includes a metal complex having a specific chemical structure, has superior oxygen reduction catalytic ability to that of a platinum-carrying carbon material, and thus have completed the present invention.

The present invention has the following aspects.

[1] A catalyst comprising: a metal complex represented by formula (1); and a carbon material,

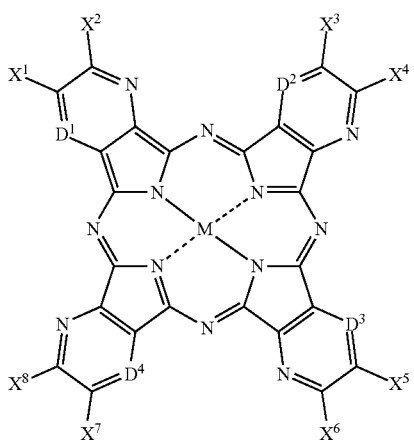

(1)

in formula (1), $X^1$ to $X^4$ each independently represent a hydrogen atom or a halogen atom, $D^1$ to $D^4$ each represent a nitrogen atom or a carbon atom wherein the carbon atom has bound thereto a hydrogen atom or a halogen atom, and M represents a metallic atom.

[2] The catalyst according to [1], wherein a proportion of the metal complex is 75% by mass or less with respect to a total of 100% by mass of the metal complex and the carbon material.

[3] The catalyst according to [1] or [2], wherein the carbon material contains a carboxyl group, and a content of the carboxyl groups is 20% by mass or less with respect to 100% by mass of the carbon material.

[4] The catalyst according to any one of [1] to [3], wherein the metal complex is a compound represented by formula (2),

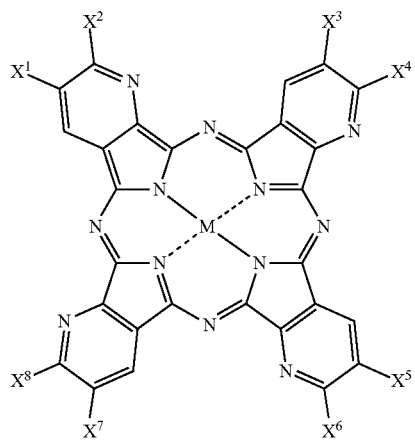

(2)

in formula (2), $X^1$ to $X^8$ each independently represent a hydrogen atom or a halogen atom, and M represents a metallic atom.

[5] A liquid composition, comprising: the catalyst according to any one of [1] to [4]; and a liquid medium.

[6] An electrode comprising: the catalyst according to any one of [1] to [4].

[7] A catalyst electrode for electrochemical reaction, comprising:

the catalyst according to any one of [1] to [4].

[8] A fuel cell, comprising: the electrode according to [6].

[9] An air battery, comprising: the electrode according to [6].

Advantageous Effects of Invention

According to the present invention, a catalyst can be obtained which has oxygen reduction catalytic ability surpassing that of a platinum-carrying carbon material.

DESCRIPTION OF EMBODIMENTS

Figure 1:
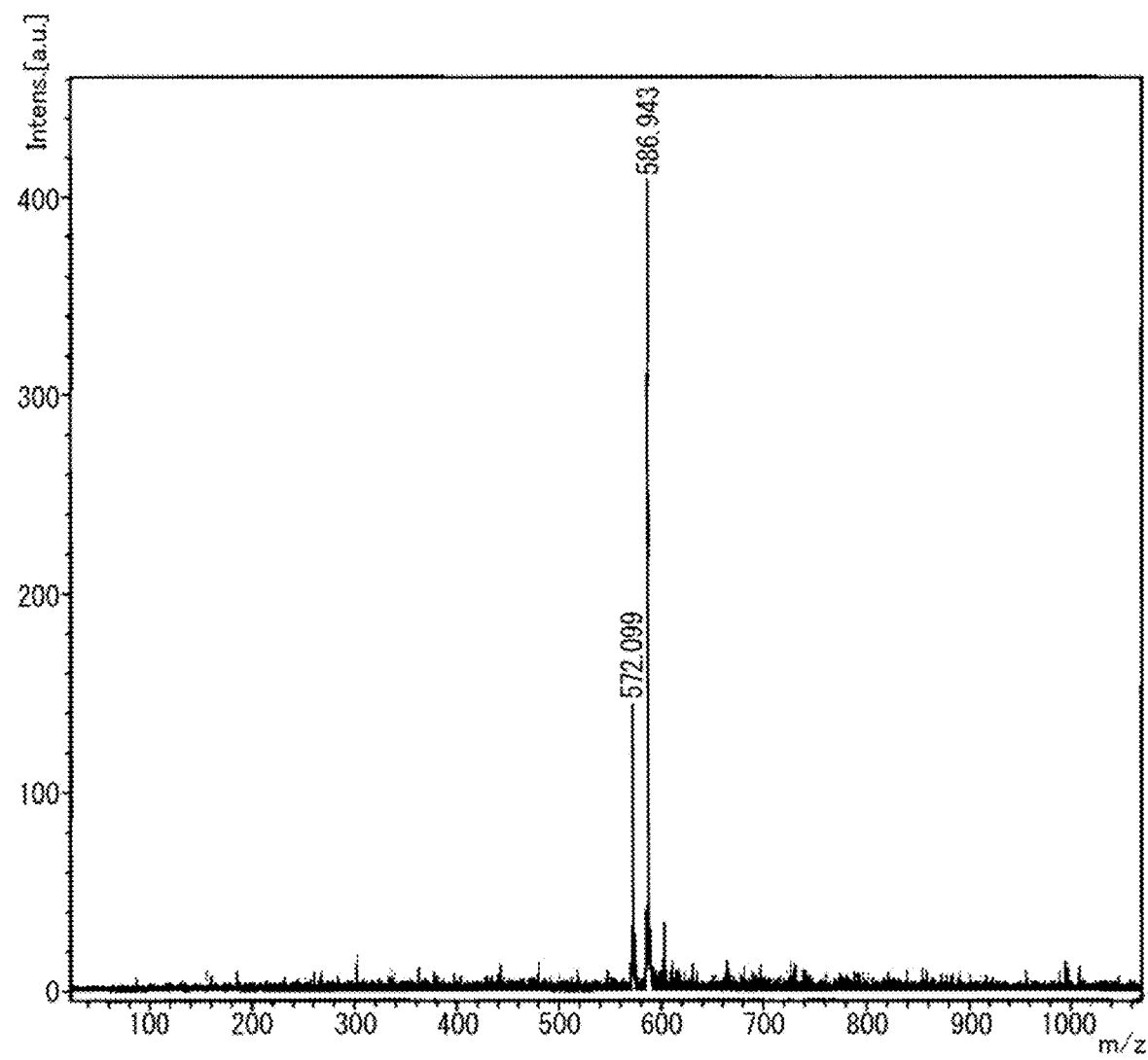
FIG. 1 illustrates a spectrum diagram showing measurement results obtained by MALDI-TOF mass spectrometry in Example 1.

In the present specification, the following terms have the following meanings.

"Heteroatom" means an atom other than a carbon atom and a hydrogen atom.

"To" used to represent a numerical range means that the range includes numerical values stated before and after the preposition "to" as a lower limit value and an upper limit value.

<Catalyst>

The catalyst of the present embodiment (hereinafter referred to as "present catalyst") includes a metal complex represented by formula (1) and a carbon material.

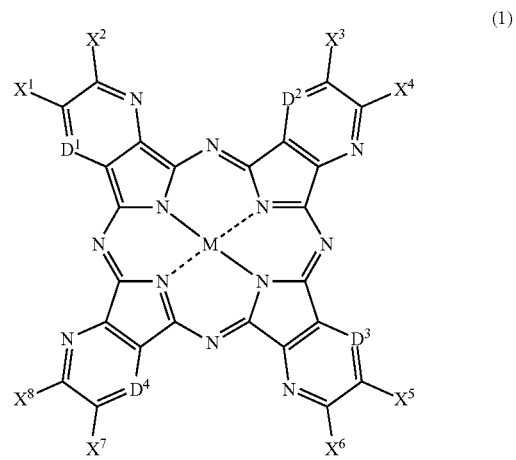

(1)

In formula (1), $X^1$ to $X^8$ each independently represent a hydrogen atom or a halogen atom, $D^1$ to $D^4$ each represent a nitrogen atom or a carbon atom wherein the carbon atom has bound thereto a hydrogen atom or a halogen atom, and M represents a metallic atom.

The bond between the nitrogen atom and M means coordination of the nitrogen atom to M. To M may be further bound a halogen atom, a hydroxyl group, or a hydrocarbon group having 1 to 8 carbon atoms as a ligand. In addition, an anionic counterion may be present so that electrical neutrality is maintained.

The valency of M is not particularly limited. To make the metal complex electrostatically neutral, a halogen atom, a hydroxyl group, or an alkyloxy group having 1 to 8 carbon atoms, as a ligand (for example, axial ligand), may be bound thereto, or an anionic counterion may be present therewith. As the anionic counterion, a halide ion, a hydroxide ion, a nitrate ion, and a sulfate ion may be exemplified.

The structure of the alkyl group in the alkyloxy group having 1 to 8 carbon atoms may be linear, branched, or cyclic.

As M, a scandium atom, a titanium atom, a vanadium atom, a chromium atom, a manganese atom, an iron atom, a cobalt atom, a nickel atom, a copper atom, a zinc atom, a yttrium atom, a zirconium atom, a niobium atom, a ruthenium atom, a rhodium atom, a palladium atom, a lanthanum atom, a cerium atom, a praseodymium atom, a neodymium atom, a promethium atom, a samarium atom, an europium atom, a gadolinium atom, a terbium atom, a dysprosium atom, a holmium atom, an erbium atom, a thulium atom, a ytterbium atom, a lutetium, an actinium atom, a thorium atom, a protactinium atom, a uranium atom, a neptunium atom, a plutonium atom, an americium atom, a curium atom, a berkelium atom, a californium atom, an einsteinium atom, a fermium atom, a mendelevium atom, a nobelium atom, and a lawrencium atom may be exemplified.

Among these, the iron atom, the manganese atom, the cobalt atom, the copper atom, and the zinc atom are preferred, with the iron atom, the manganese atom, and the cobalt atom being more preferred, and the iron atom being particularly preferred.

In a case of the metal complex represented by formula (1), there may be an isomer as represented by formula (1').

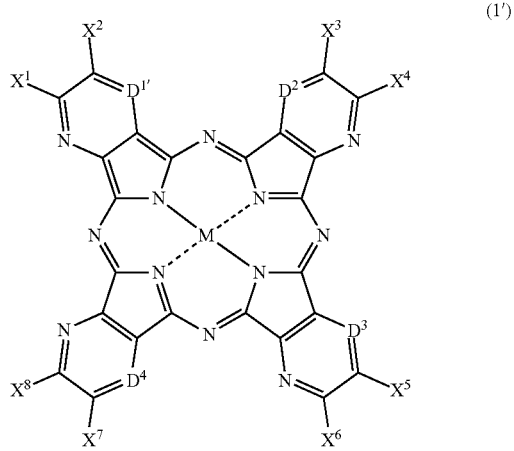

(1')

In formula (1'), $X^1$ to $X^8$ each independently represent a hydrogen atom or a halogen atom, $D^1$ and $D^2$ to $D^4$ each represent a nitrogen atom or a carbon atom wherein the carbon atom has bound thereto a hydrogen atom or a halogen atom, and M represents a metallic atom.

The metal complex in the present invention may be an isomer as represented by formula (1'). Therefore, it can be said that in formula (1), the position of the nitrogen atom and the position of $D^1$ are exchangeable with each other in the cyclic structure having $D^1$.

In the present invention, the isomer of the metal complex is not limited to that represented by formula (1'). For example, regarding formula (1) or formula (1'), in at least one selected from the respective cyclic structures containing $D^2$ to $D^4$, respectively, the position of the nitrogen atom may be exchanged with any position of $D^2$ to $D^4$ within the same cyclic structure.

Hereinafter, preferred embodiments of the metal complex of formula (1) will be described in more detail. In any of the preferred embodiments, there may be the isomer as represented by formula (1'). These isomers are included in the preferred embodiments of the metal complex of the present invention.

In the present invention, it is preferred that D to $D^4$ each represent a carbon atom and the carbon atom has bound thereto a hydrogen atom.

That is, in the present catalyst, the metal complex is preferably a compound represented by formula (2). In the present catalyst, in a case where the metal complex is a compound represented by formula (2), an electrode containing the present catalyst has even superior conductivity.

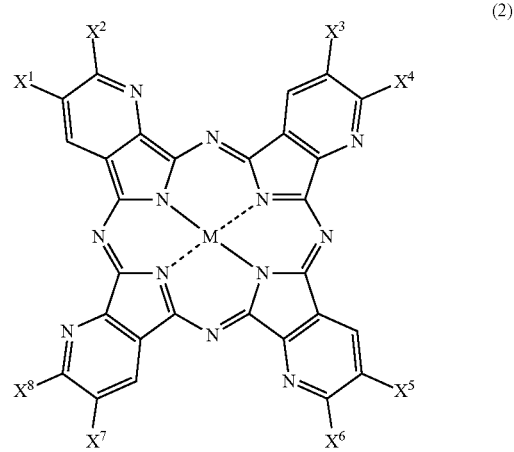

(2)

In formula (2), $X^1$ to $X^8$ each independently represent a hydrogen atom or a halogen atom, and M represents a metallic atom.

In the metal complex, it is more preferred that $D^1$ to $D^4$ each represent a carbon atom wherein the carbon atom has bound thereto a hydrogen atom, and $X^1$ to $X^8$ each represent a hydrogen atom.

That is, in the present catalyst, the metal complex is preferably a compound represented by formula (3). In the present catalyst, in a case where the metal complex is a compound represented by formula (3), the present catalyst has even superior oxygen reduction catalytic ability.

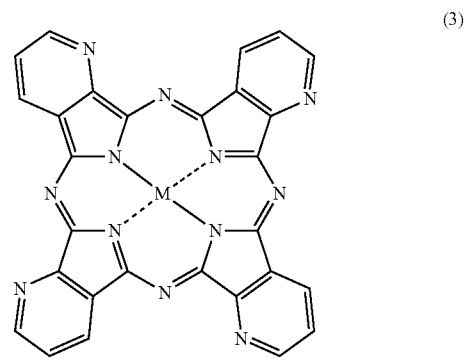

(3)

In formula (3), M represents a metallic atom.

Furthermore, in a case where the metal complex is a compound represented by formula (3), it is more preferred that M represents an iron atom. That is, in the present catalyst, it is more preferred that the metal complex is iron tetrapyridopolyphyrazine (hereinafter referred to as "FeTPP") represented by formula (4). In a case where the metal complex is FeTPP, the present catalyst has particularly superior oxygen reduction catalytic ability.

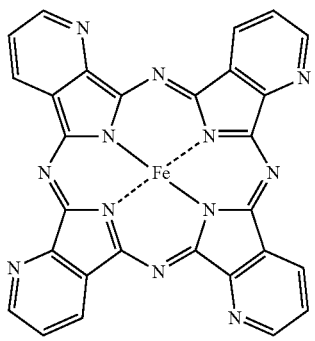

(4)

A content of nitrogen atoms in the metal complex is preferably 14% by mass or more, more preferably 16% by mass or more, even more preferably 18% by mass or more, and particularly preferably 19% by mass or more, with respect to 100% by mass of the metal complex. In a case where the content of nitrogen atoms in the metal complex is 14% by mass or more, the present catalyst has even superior oxidation reduction catalytic ability.

The content of nitrogen atoms in the metal complex is preferably 40% by mass or less, more preferably 30% by mass or less, even more preferably 28% by mass or less, and particularly preferably 25% by mass or less, with respect to 100% by mass of the metal complex. In a case where the content of nitrogen atoms in the metal complex is 40% by mass or less, the present catalyst has superior conductivity.

It can be said that the content of nitrogen atoms in the metal complex is preferably 14% to 40% by mass, more preferably 16% to 30% by mass, even more preferably 18% to 28% by mass, and particularly preferably 19% to 25% by mass, with respect to 100% by mass of the metal complex.

A method for producing the metal complex is not particularly limited. For example, a method may be exemplified in which a dicyano compound such as pyridine-2,3-dicarbonitrile and a metallic atom are heated in an alcohol solvent in the presence of a basic substance. Here, as the basic substance, inorganic bases such as potassium carbonate, sodium carbonate, calcium carbonate, sodium bicarbonate, and sodium acetate; and organic bases such as triethylamine, tributylamine, and diazabicycloundecene may be exemplified.

The carbon material is preferably derived from conductive carbon. As specific examples of the carbon material, graphite, amorphous carbon, activated carbon, graphene, carbon black, carbon fiber, mesocarbon microbead, microcapsule carbon, fullerene, carbon nanofoam, carbon nanotube, carbon nanohorn, and the like may be exemplified. Among these, the graphite, the amorphous carbon, the activated carbon, the graphene, the carbon black, the carbon fiber, the fullerene, and the carbon nanotube are preferred, with the carbon nanotube, the carbon black, and the graphene being more preferred, and the carbon nanotube being even more preferred.

As the carbon nanotube, single-walled carbon nanotube (hereinafter referred to as "SWCNT"), double-walled carbon nanotube (hereinafter referred to as "DWCNT"), and multi-walled carbon nanotube (hereinafter referred to as "MWCNT") may be exemplified. Among these, from the viewpoint that the present catalyst has superior conductivity, DWCNT and MWCNT are preferred, with MWCNT being more preferred.

The carbon material may have a functional group such as a hydroxyl group, a carboxyl group, a nitrogen-containing group, a silicon-containing group, a phosphorus-containing group such as a phosphoric group, and a sulfur-containing group such as a sulfonic group. Among these, the carbon material preferably has a carboxyl group. In a case where the carbon material has a carboxyl group, the metal complex is easily adsorbed on the surface of the carbon material, which allows the present catalyst to have superior durability and even superior oxygen reduction catalytic ability.

The carbon material may have a heteroatom. As the heteroatom, an oxygen atom, a nitrogen atom, a phosphorus atom, a sulfur atom, a silicon atom, and the like may be exemplified. In a case where the carbon material has a heteroatom, the carbon material may contain one heteroatom alone or may contain two or more heteroatoms. Meanwhile, the carbon material may be oxidized, hydroxylated, nitrided, phosphatized, sulfided, or silicified.

In a case where the carbon material contains a carboxyl group, a content of the carboxyl groups is preferably 20% by mass or less, more preferably 15% by mass or less, and even more preferably 10% by mass or less, with respect to 100% by mass of the carbon material. In a case where the content of the carboxyl groups is equal to or lower than the upper limit, the production cost of the present catalyst tends to decrease.

In a case where the carbon material contains a carboxyl group, a content of the carboxyl groups is preferably 1% by mass or more, more preferably 5% by mass or more, and even more preferably 8% by mass or more. In a case where the content of the carboxyl groups is equal to or higher than the lower limit, the present catalyst has even superior durability and oxygen reduction catalytic ability.

As described above, it can be said that in a case where the carbon material contains a carboxyl group, a content of the carboxyl groups is preferably 1% to 20% by mass, more preferably 5% to 15% by mass, even more preferably 8% to 15% by mass, and particularly preferably 8% to 10% by mass, with respect to 100% by mass of the carbon material.

The content of the carboxyl groups can be measured by elemental analysis, X-ray photoelectron spectroscopy, or the like.

In the present catalyst, from the viewpoint of having superior conductivity and even superior oxygen reduction catalytic ability, the carbon material is preferably DWCNT with carboxyl groups or MWCNT with carboxyl groups, with MWCNT with carboxyl groups being more preferred.

A specific surface area of the carbon material is preferably 0.8 $m^2/g$ or more, more preferably 1.0 $m^2/g$ or more, even more preferably 1.1 $m^2/g$ or more, particularly preferably 1.5 $m^2/g$ or more, and most preferably 2.0 $m^2/g$ or more. In a case where the specific surface area is 0.8 $m^2/g$ or more, agglomeration of the catalyst is easily prevented so that the catalyst has even superior oxygen reduction catalytic ability. An upper limit of the specific surface area is not particularly limited. The upper limit of the specific surface area can be set to 2,000 $m^2/g$, for example. The specific surface area of the carbon material may be, for example, 0.8 to 2,000 $m^2/g$, 1.0 to 2,000 $m^2/g$, 1.1 to 2,000 $m^2/g$, 1.5 to 2,000 $m^2/g$, or 2.0 to 2,000 $m^2/g$.

The specific surface area can be measured by a nitrogen adsorption BET method with a specific surface area measuring apparatus.

An average particle size of the carbon material is not particularly limited. The average particle size of the carbon material is preferably, for example, 5 nm to 1,000 μm. The following (A1) to (A3) may be exemplified as methods for adjusting the average particle size of the carbon material so as to be within the aforementioned numerical range.

(A1): A method in which particles are ground by a ball mill or the like, the resulting coarse particles are dispersed in a dispersant to give a desired particle size, and then dry-hardening is performed.

(A2): A method in which particles are ground by a ball mill or the like, and the resulting coarse particles are sieved or the like to select a particle size.

(A3): A method in which production conditions are optimized to adjust a particle size of particles at the time of producing the carbon material.

The average particle size can be measured with a particle size distribution measuring apparatus, an electron microscope, or the like.

In the present catalyst, a proportion of the metal complex is preferably 75% by mass or less, more preferably 50% by mass or less, and even more preferably 30% by mass or less, with respect to a total of 100% by mass of the metal complex and the carbon material. In a case where the proportion of the metal complex is equal to or lower than the upper limit, the present catalyst has superior conductivity.

The proportion of the metal complex is preferably 0.1% by mass or more, more preferably 0.5% by mass or more, and even more preferably 1% by mass or more, with respect to a total of 100% by mass of the metal complex and the carbon material. In a case where the proportion of the metal complex is equal to or higher than the lower limit, the present catalyst has even superior oxygen reduction catalytic ability.

It can be said that the proportion of the metal complex is preferably 0.1% to 75% by mass, more preferably 0.5% to 50% by mass, and even more preferably 1% to 30% by mass, with respect to a total of 100% by mass of the metal complex and the carbon material.

(Application)

The present catalyst can be applied as a material for various industrial products.

The present catalyst has oxygen reduction catalytic ability. Therefore, the present catalyst can be suitably used for industrial applications in which a reduction reaction of oxygen is utilized.

For example, the present catalyst in a powdery state can be used, as it is, as a raw material for various industrial products and parts.

In addition, the present catalyst and a platinum-carrying carbon material (for example, Pt/C as described below) may be mixed and used. In a case where the present catalyst is used in combination with the platinum-carrying carbon material, it can be expected that effects such as improved oxygen reduction catalytic ability and decreased production cost would be obtained.

(Action Effect)

The present catalyst as described above has improved oxygen reduction catalytic ability because it includes the aforementioned metal complex and carbon material. Thus, oxygen reduction catalytic ability surpassing that of a platinum-carrying carbon material is achieved in the present catalyst.

As mentioned in the techniques described in Patent Literatures 1 and 2, in the prior art, it was within the common general knowledge of those skilled in the art that a compound having a phthalocyanine ring, which has superior conductivity, can be selected as a catalyst for a fuel cell, from the viewpoint of ensuring conductivity of the catalyst. On the other hand, the metal complex included in the present catalyst tends to have relatively lower conductivity than that of a compound having a phthalocyanine ring.

Therefore, it can be said that in a case where the metal complex represented by formula (1) is selected in spite of its relatively low conductivity, the present catalyst exhibits a completely unexpected action effect in that its oxygen reduction catalytic ability is superior to that of a platinum-carrying carbon material.

In the present catalyst, due to higher solubility of the metal complex in various solvents, the upper limit of content of the metal complex in the present catalyst increases, which allows the catalyst to have even superior oxygen reduction catalytic ability.

In the present catalyst, due to higher content of nitrogen atoms in the metal complex, it is easier to increase a content of nitrogen atoms than a case where a compound having a phthalocyanine ring is selected, which allows the catalyst to have even superior oxygen reduction catalytic ability.

<Liquid Composition>

A liquid composition of the present embodiment (hereinafter referred to as "present liquid composition") includes the present catalyst and a liquid medium. The present liquid composition may further include optional components other than the present catalyst and the liquid medium.

The liquid medium may be a compound in which the present catalyst is easily dissolved (that is, in which the present catalyst is highly soluble) or a compound in which the present catalyst is hardly dissolved (that is, in which the present catalyst is poorly soluble). In a case where the liquid medium is a compound in which the present catalyst is easily dissolved, the present liquid composition is in the form of a solution. In a case where the liquid medium is a compound in which the present catalyst is hardly dissolved, the liquid composition is in the form of a dispersion.

The liquid medium may be an inorganic medium such as water or an organic medium.

As specific examples of the organic medium, alcohol such as methanol, ethanol, propanol, isopropanol (2-propanol), and 1-hexanol; dimethyl sulfoxide; tetrahydrofuran; aprotic polar solvents such as N-methyl pyrrolidone, dimethylformamide, and acetone; and nonpolar solvents such as chloroform, dichloromethane, 1,4-dioxane, benzene, and toluene may be exemplified. However, the liquid medium is not limited to these examples. The liquid medium may be used singly, or two or more thereof may be used in combination.

The present liquid composition may include, as an optional component, a perfluorocarbon material that contains a structural unit based on polytetrafluoroethylene and a perfluoro side chain having a sulfonic acid group. As a specific example of the perfluorocarbon material, Nafion (product name, manufactured by DuPont) may be exemplified.

The present liquid composition can be produced by mixing or kneading the present catalyst, the liquid medium and, if necessary, the perfluorocarbon material.

At the time of performing the mixing or kneading, ultrasonication, a mixer, a blender, a kneader, a homogenizer, a bead mill, a ball mill, or the like may be used. Before and after the kneading operation, a sieve or the like may be used to adjust an average particle size of the particles.

In a case of producing a liquid composition that includes the perfluorocarbon material, the present catalyst, the perfluorocarbon material, and, if necessary, water and alcohol may be mixed and stirred until homogeneity is achieved.

The present liquid composition can be applied to the surface of various base materials. For example, applying the present liquid composition to the surface of a base material and removing the liquid medium makes it possible to provide a layer containing the present catalyst (hereinafter referred to as "layer of the present catalyst") on the surface of various base materials.

As the base material, aluminum foil, electrolytic aluminum foil, aluminum mesh (expanded metal), foamed aluminum, punched aluminum, aluminum alloy such as duralumin, copper foil, electrolytic copper foil, copper mesh (expanded metal), foamed copper, punched copper, copper alloy such as brass, brass foil, brass mesh (expanded metal), foamed brass, punched brass, nickel foil, nickel mesh, corrosion-resistant nickel, nickel mesh (expanded metal), punched nickel, foamed nickel, nickel sponge, metal zinc, corrosion-resistant metal zinc, zinc foil, zinc mesh (expanded metal), steel plate, punched steel plate, silver, and the like may be exemplified.

The base material may be a substrate-like base material, in which examples of the substrate include a silicon substrate; a metal substrate such as gold, iron, stainless steel, copper, aluminum, and lithium; an alloy substrate containing any combination of these metals; an oxide substrate such as indium tin oxide (ITO), indium zinc oxide (IZO), and antimony tin oxide (ATO); and a carbon substrate such as glassy carbon, pyrolytic graphite, and carbon felt. However, the base material is not limited to these examples.

(Action Effect)

Due to inclusion of the aforementioned present catalyst, the present liquid composition as described above can impart, to various base materials, oxygen reduction catalytic ability surpassing that of a platinum-carrying carbon material.

The present liquid composition can be used, for example, as a coating liquid to be applied to the surface of a base material in a case of producing an electrode as described below. The liquid composition may be used, as it is, as a coating liquid, or may be used as a coating liquid after adjusting a content or solid content of the present catalyst.

<Electrode>

The electrode of the present embodiment (hereinafter referred to as "present electrode") includes the present catalyst. The present electrode may have a base material that is in contact with a layer of the present catalyst.

The present electrode may be formed by using the present liquid composition as a coating liquid. In a case where the present electrode is formed by using the present liquid composition, the present liquid composition is applied to the surface of a conductive base material and components (for example, liquid medium, perfluorocarbon material, and the like) other than the present catalyst are removed. In a case where the components other than the present catalyst are removed, drying by heating may be performed, or drying followed by pressing may be performed.

The present electrode may have a form in which the layer of the present catalyst is provided on the surface of a conductive base material. In this case, a thickness of the catalyst layer is not particularly limited, and may be 0.01 to 100 μm, for example. In a case where the thickness is equal to or higher than the lower limit, the present electrode has superior durability. In a case where the thickness is equal to or lower than the upper limit, the present electrode hardly causes any deterioration in performance.

As the conductive base material, the same base materials as those described in the section "Liquid composition" may be exemplified.

Meanwhile, the layer of the present catalyst may be provided on the surface of a base material by vacuum deposition or the like.

As the substrate, the same base materials as those described in the section "Method for producing electrodes" may be exemplified.

In the present electrode, the layer of the present catalyst may be present on one side or both sides of a base material.

The present electrode can be used as an electrode of a fuel cell. In a case of being used as an electrode of a fuel cell, an electrolyte membrane may be placed between a pair of electrodes.

In a case where the present electrode is used as an electrode of a fuel cell, oxygen reduction reaction represented by formula (6) easily proceeds under an acidic condition, and the reduction reaction represented by formula (7) easily proceeds under an alkaline condition.

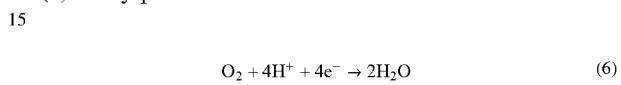

The present electrode may be used as an electrode for a fuel cell, in which a substrate having a porous support layer, for example, is used as a base material. In a case of being used as an electrode of a fuel cell, the present electrode may be used as an electrode that is either a cathode or an anode.

The porous support layer is a layer that diffuses gas. The porous support layer is not particularly limited as long as the layer has electron conductivity, high gas diffusivity, and high corrosion resistance. As the porous support layer, carbon-based porous materials such as carbon paper and carbon cloth, stainless steel foil, and aluminum foil coated with a corrosion-resistant material may be exemplified.

The present electrode can be suitably applied to an electrode for a power storage device (power generation device) such as a fuel cell or an air battery.

(Action Effect)

Due to having a layer of the present catalyst, the present electrode as described above has improved oxygen reduction catalytic ability.

<Catalyst Electrode for Electrochemical Reaction>

The catalyst electrode for electrochemical reaction of the present embodiment (hereinafter referred to as "present catalyst electrode for electrochemical reaction") includes the present catalyst.

The present catalyst electrode for electrochemical reaction is an electrode having a function as a catalyst for electrochemical reaction such as predetermined reduction reaction or predetermined oxidation reaction.

For example, the present catalyst electrode for electrochemical reaction can have a function as a catalyst for the reduction reaction represented by formula (6) or (7).

The present catalyst electrode for electrochemical reaction may have a base material that is in contact with a layer of the present catalyst.

The present catalyst electrode for electrochemical reaction may be formed by using the present liquid composition as a coating liquid, similar to the present electrode as described above.

The present catalyst electrode for electrochemical reaction may have a form in which the layer of the present catalyst is provided on the surface of a conductive base material, similar to the present electrode as described above.

As the substrate, the same base materials as those described in the section "Method for producing electrodes" are mentioned.

In the present electrode, the layer of the present catalyst may be present on one side or both sides of a base material.

The present catalyst electrode for electrochemical reaction may be produced by vacuum deposition or the like.

(Action Effect)

Due to having a layer of the present catalyst, the present catalyst electrode for electrochemical reaction as described above has improved oxygen reduction catalytic ability.

<Fuel Cell>

The fuel cell of the present embodiment (hereinafter referred to as "present fuel cell") has the present electrode as described above.

The present fuel cell may further have a second electrode, an electrolyte, and a separator.

In the present fuel cell, the present electrode may be a cathode or an anode. However, the present electrode is preferably a cathode, and more preferably an oxygen electrode. Meanwhile, the oxygen electrode means an electrode to which an oxygen-containing gas (such as air) is supplied.

The second electrode is an electrode used in combination with the present electrode. In a case where the present electrode is a cathode, the second electrode is an anode; and in a case where the present electrode is an anode, the second electrode is a cathode.

As the second electrode, single metals such as aluminum and zinc, and oxides of these metals may be exemplified. However, the second electrode is not limited to these examples.

The electrolyte is preferably an aqueous electrolytic solution. As the aqueous electrolytic solution, alkaline aqueous solutions such as potassium hydroxide aqueous solution and sodium hydroxide aqueous solution; and acidic aqueous solutions such as sulfuric acid aqueous solution may be exemplified. The electrolyte may be used singly, or two or more thereof may be used in combination. However, the electrolyte is not limited to these examples, and may be an inorganic solid electrolyte.

The separator is a member that separates the present electrode and the second electrode, and holds the electrolyte to secure ion conductivity between the present electrode and the second electrode.

As specific examples of the separator, microporous polymers such as polyethylene, polypropylene, polytetrafluoroethylene, polyvinylidene fluoride, cellulose, cellulose acetate, hydroxyalkyl cellulose, carboxymethyl cellulose, polyvinyl alcohol, cellophane, polystyrene, polyacrylonitrile, polyacrylamide, polyvinyl chloride, polyamide, vinylon, and poly(meth)acrylic acid, gel compounds, ion exchange membranes, cyclized polymers, poly(meth)acrylate-containing polymers, sulfonate-containing polymers, quaternary ammonium salt-containing polymers, quaternary phosphonium salt-containing polymers, and the like may be exemplified. However, the separator is not limited to these examples.

The present fuel cell may be a primary cell or a secondary cell.

As the form of the present fuel cell, molten carbonate fuel cell (MCFC), phosphoric acid fuel cell (PAFC), solid oxide fuel cell (SOFC), polymer electrolyte fuel cell (PEFC), and the like may be exemplified. The form of the present fuel cell is not limited to these examples, and is preferably PEFC.

(Action Effect)

The present fuel cell as described above has the present electrode, and thus oxygen reduction characteristics of oxygen reduction reaction are improved in the electrode. As a result, the present fuel cell has superior energy conversion efficiency.

<Air Battery>

An air battery of the present embodiment (hereinafter referred to as "present air battery") has the present electrode as described above. In the present air battery, it is preferable to apply the present electrode as an oxygen electrode.

The present air battery may further have a fuel electrode, an electrolyte, and a separator.

The fuel electrode is an electrode used in combination with the present electrode. As the fuel electrode, those similar to the specific examples described in the section "Second electrode" may be exemplified.

As the electrolyte, those similar to the electrolytes described in the section "Fuel cell" may be exemplified.

As the separator, those similar to the separators described in the section "Fuel cell" may be exemplified.

(Action Effect)

The present air battery as described above has the present electrode, and thus oxygen reduction characteristics of oxygen reduction reaction are improved in the electrode. As a result, the present air battery has superior energy conversion efficiency.

EXAMPLES

Hereinafter, the present embodiments will be specifically described by way of examples. However, the present invention is not limited by the following description.

Abbreviation

DMSO: Dimethyl sulfoxide.
FeTPP: Iron tetrapyridopolyphyrazine.
DBU: Diazabicycloundecene.
MWCNT: Multi-walled carbon nanotube (Carbon nanotube, Multi-walled, 724769-25G, manufactured by Sigma Aldrich).
CB: Carbon black (Seast S, manufactured by Tokai Carbon Co., Ltd.).
GO: Graphene oxide (Graphene Oxide, manufactured by Nisina Materials Co., Ltd.).
Pt/C: Platinum-carrying carbon (728549-1G, manufactured by Sigma Aldrich).
KOH: Potassium hydroxide aqueous solution.
UV-vis: Ultraviolet visible spectrophotometer.
MALDI-TOF: Matrix assisted laser desorption/ionization-time of flight mass spectrometry).
ATR: Attenuated total reflection.
LSV: Linear sweep voltammetry.
TEM: Transmission electron microscope.
STEM: Scanning transmission electron microscope.
EDX: Energy dispersive X-ray.
K-L: Koutecky-Levich.
RRDE: Rotating ring disk electrodes.

(MALDI-TOF Mass Spectrometry)

For the MALDI-TOF mass spectrometry, an aqueous dispersion of the product and an aqueous solution of α-cyano-4-hydroxycinnamic acid were mixed at a mass ratio of 1:4, the mixture was dried at room temperature, and then measurement was performed using a matrix-assisted laser desorption/ionization time-of-flight mass spectrometer (REFLEX III, manufactured by Bruker Daltonics).

(UV-Vis)

For UV-vis, measurement was performed using an ultraviolet-visible spectrophotometer (V-670, manufactured by JASCO) in a state in which each sample is dispersed in methanol or DMSO.

(Infrared Spectroscopic Analysis)

For the infrared spectroscopic analysis, measurement was performed on a powdery sample by the ATR method using an infrared spectrophotometer (FT/IR-6700, manufactured by JASCO).

(Laser Raman Spectroscopic Analysis)

For the laser Raman spectroscopic analysis, measurement was performed on a powdery sample on a silicon substrate by irradiation with excitation light of 532.10 nm, using a microscopic laser Raman spectrometer (LabRAM HR-800, manufactured by Horiba Ltd.). In a case where a peak intensity of D band is set as $I_D$ and a peak intensity of G band is set as $I_G$, a peak intensity ratio R was calculated by equation (8).

$$R=(I_D/I_G) \quad (8)$$

(TEM)

A transmission electron microscope (H-7650, manufactured by Hitachi)-observed image was obtained.

(STEM)

A scanning transmission electron microscope (S-5200, manufactured by Hitachi)-observed image was obtained.

(EDX Spectral Analysis)

The EDX spectral analysis was performed using an atomic resolution analytical electron microscope (JEM-ARM200F, manufactured by JEOL).

(TG-DTA Measurement)

The TG-DTA measurement was performed by a thermal analyzer (Thermo plus EvoII, manufactured by Rigaku Corporation) under a nitrogen atmosphere at a condition with a temperature elevation rate of 5° C./min.

(LSV Curve)

The LSV curve was obtained with CompactStat (NH-COMPACT, manufactured by Ivium Technologies) while using oxygen-saturated 0.1 M KOH as an electrolytic solution, under a condition of a sweep rate of 5 mV/s, in a sweep range of which the lower limit is −0.8 V and the upper limit is 0.2V. A rotation speed of the rotating disk was set to 2,400 rpm, Pt wire was used as a counter electrode, and Ag/AgCl was used as a reference electrode.

(Calculation of Number of Reaction Electron)

The number of reaction electrons was calculated based on a K-L plot. Current densities of the ring electrode and the disk electrode were calculated from the LSV measurement, and the number of reaction electrons was calculated based on RRDE.

Example 1

258 mg of pyridine-2,3-dicarbonitrile, 135 mg of iron(III) chloride hexahydrate, and 20 mg of DBU were mixed in a test tube and dissolved in a mixed solvent containing 10 mL of methanol and 10 mL of DMSO, to obtain a solution. The solution was purged with nitrogen and heated at 180° C. for 3 hours, to obtain a reaction product containing FeTPP. The reaction product was centrifuged 3 times with acetone and dried. The sediment remaining after centrifugation was dissolved in concentrated sulfuric acid and added dropwise to water, to precipitate FeTPP. The precipitated FeTPP was collected by centrifugation, washed with methanol, and dried, to obtain the metal complex of Example 1.

The metal complex of Example 1 was dissolved in DMSO, and measurement by MALDI-TOF mass spectrometry and measurement by UV-vis were performed.

FIG. 1 illustrates a spectrum diagram showing the measurement results obtained by MALDI-TOF mass spectrometry in Example 1. FeTPP has a mass average molecular weight of 572.07. In the spectrum diagram of FIG. 1, peaks were observed at positions corresponding to mass average molecular weights of 572.099 and 586.943. From this result, it was suggested that the metal complex of Example 1 may have a methyl group bound to an iron atom that is a central metal.

Figure 2:
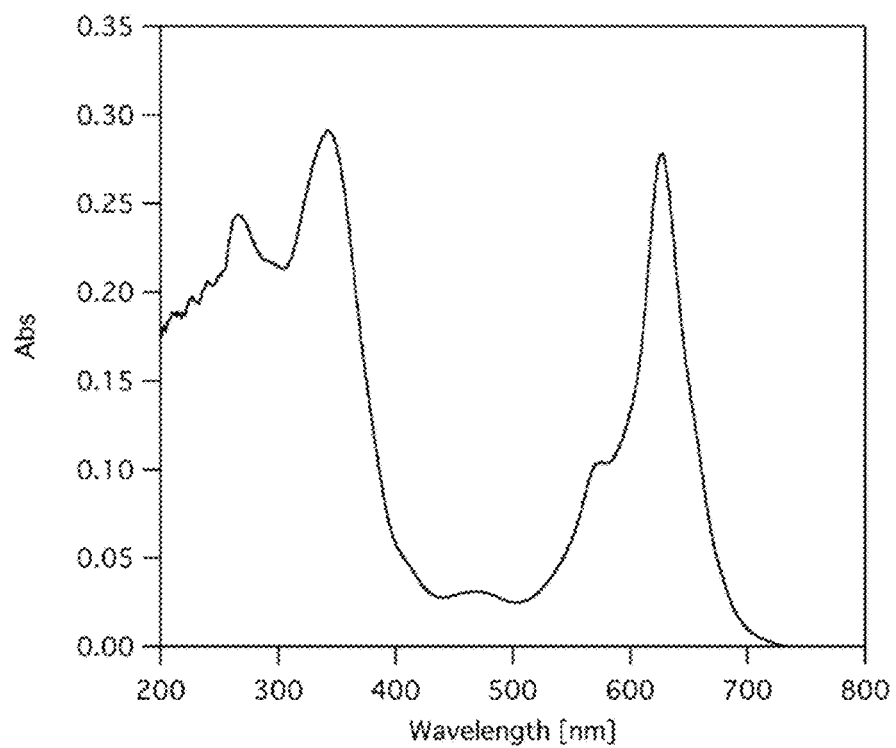
FIG. 2 illustrates a spectrum diagram showing measurement results obtained by UV-vis in Example 1.

FIG. 2 illustrates a spectrum diagram showing the measurement results obtained by UV-vis in Example 1. As illustrated in FIG. 2, in the metal complex of Example 1, a Q band unique to a phthalocyanine analog was observed near 600 nm, and a Soret band was observed near 300 to 400 nm. Accordingly, it was identified that FeTPP can be synthesized.

Example 2

A metal complex (that is, FeTPP) was obtained in the same manner as in Example 1. The obtained FeTPP was dissolved in 0.5 mL of DMSO. The resulting solution and 10 mg of MWCNT with carboxyl groups (diameter: 9.5 nm, length: 1.5 μm) were stirred with a homogenizer for 10 minutes. The stirred solution was washed with DMSO three times and then further washed with methanol three times, to obtain a methanol dispersion containing the catalyst of Example 2 (methanol dispersion of Example 2).

Example 3

A methanol dispersion containing the catalyst of Example 3 (methanol dispersion of Example 3) was obtained in the same manner as in Example 2, except that 10 mg of CB is used as the carbon material.

Example 4

A methanol dispersion containing the catalyst of Example 4 (methanol dispersion of Example 4) was obtained in the same manner as in Example 2, except that 10 mg of GO is used as the carbon material.

Example 5

A methanol dispersion containing the catalyst of Example 5 (methanol dispersion of Example 5) was obtained in the same manner as in Example 2, except that a compound represented by formula (9) is used as the metal complex.

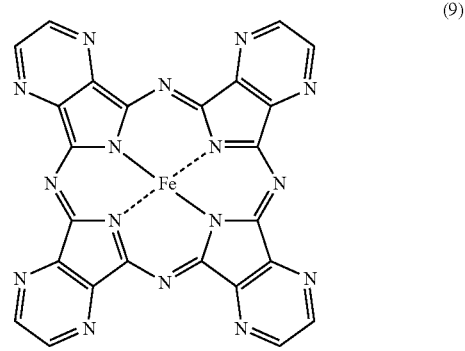

(9)

Figure 3:
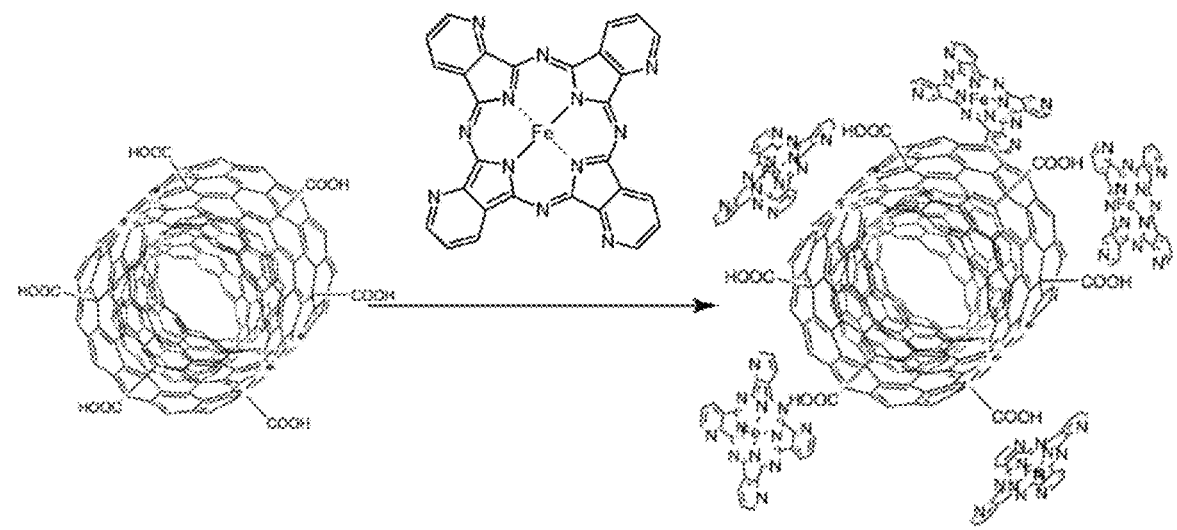
FIG. 3 illustrates a schematic diagram showing the catalyst of Example 2.

FIG. 3 illustrates a schematic diagram showing the catalyst of Example 2. In the catalyst of Example 2, since the carboxyl group of MWCNT is negatively charged, it is highly possible that FeTPP is adsorbed on the surface of MWCNT.

Figure 4:
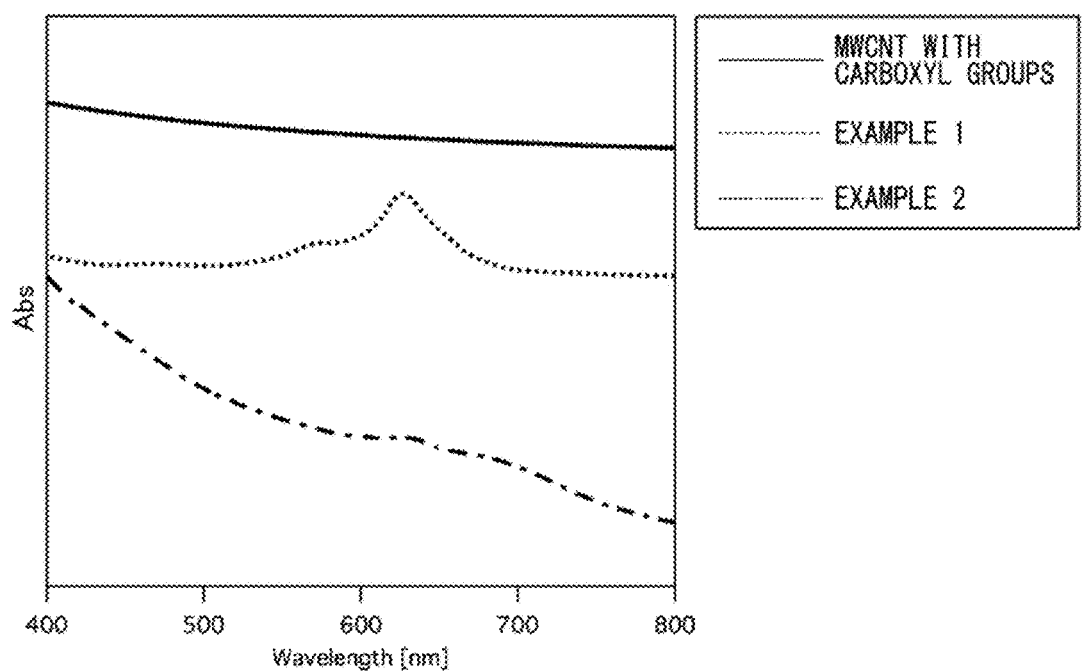
FIG. 4 illustrates a spectrum diagram showing measurement results obtained by UV-vis in Example 2.

FIG. 4 illustrates a spectrum diagram showing the measurement results obtained by UV-vis in Example 2.

The line indicated by "Example 1" in FIG. 4 shows a spectrum of the solution obtained by dissolving FeTPP of Example 1 in DMSO.

The line indicated by "Example 2" in FIG. 4 shows a spectrum of the methanol dispersion of Example 2.

The line indicated by "MWCNT with carboxyl groups" in FIG. 4 shows a spectrum of the solution obtained by dissolving MWCNT in DMSO.

As illustrated in FIG. 4, a FeTPP-derived peak (Q band) was observed in the spectrum of the methanol dispersion of Example 2. Accordingly, it was identified that the chemical structure of FeTPP is maintained in the methanol dispersion of Example 2.

Figure 5:
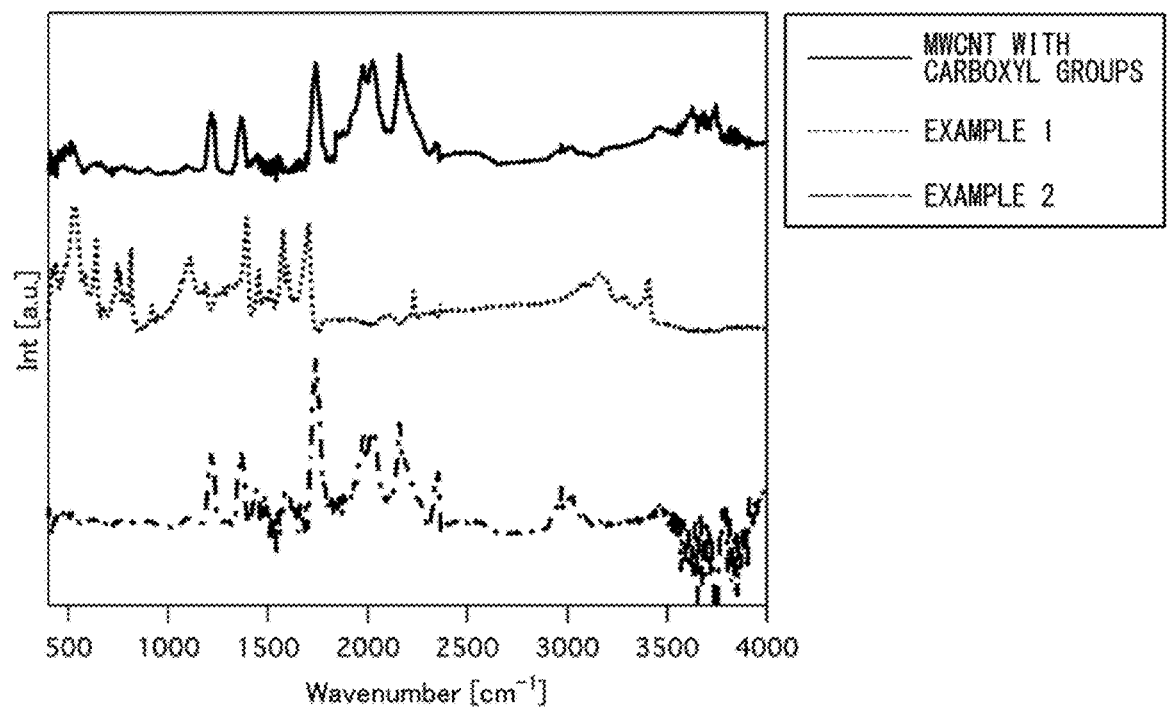
FIG. 5 illustrates a spectrum diagram showing results obtained by infrared spectroscopic analysis in Example 2.

FIG. 5 illustrates a spectrum diagram showing the results obtained by infrared spectroscopic analysis in Example 2.

The line indicated by "Example 1" in FIG. 5 shows a spectrum of the solution obtained by dissolving FeTPP of Example 1 in DMSO.

The line indicated by "Example 2" in FIG. 5 shows a spectrum of the methanol dispersion of Example 2.

The line indicated by "MWCNT with carboxyl groups" in FIG. 5 shows a spectrum of the solution obtained by dissolving MWCNT with carboxyl groups in DMSO.

As illustrated in FIG. 5, in the spectrum of the methanol dispersion of Example 2, characteristic peaks were observed, respectively, for FeTPP and MWCNT with carboxyl groups. Accordingly, it was identified that the respective chemical structures of FeTPP and MWCNT are maintained in the methanol dispersion of Example 2.

Figure 6:
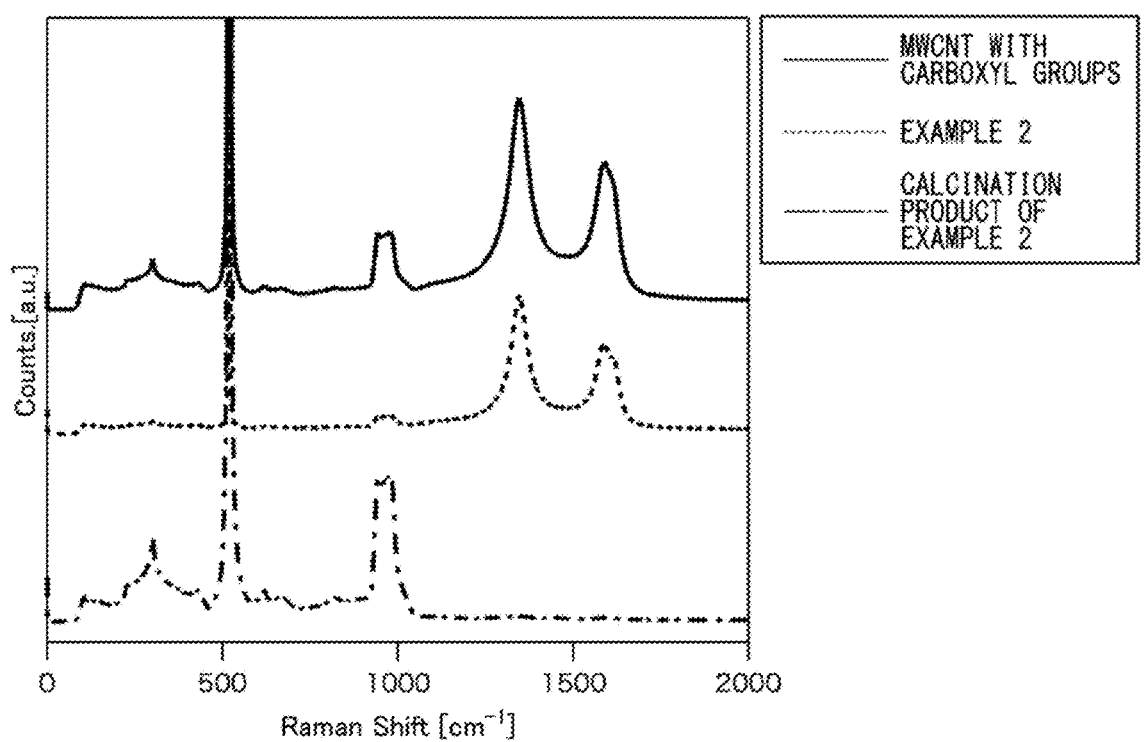
FIG. 6 illustrates a graph showing results obtained by laser Raman spectroscopic analysis in Example 2.
Figure 7:
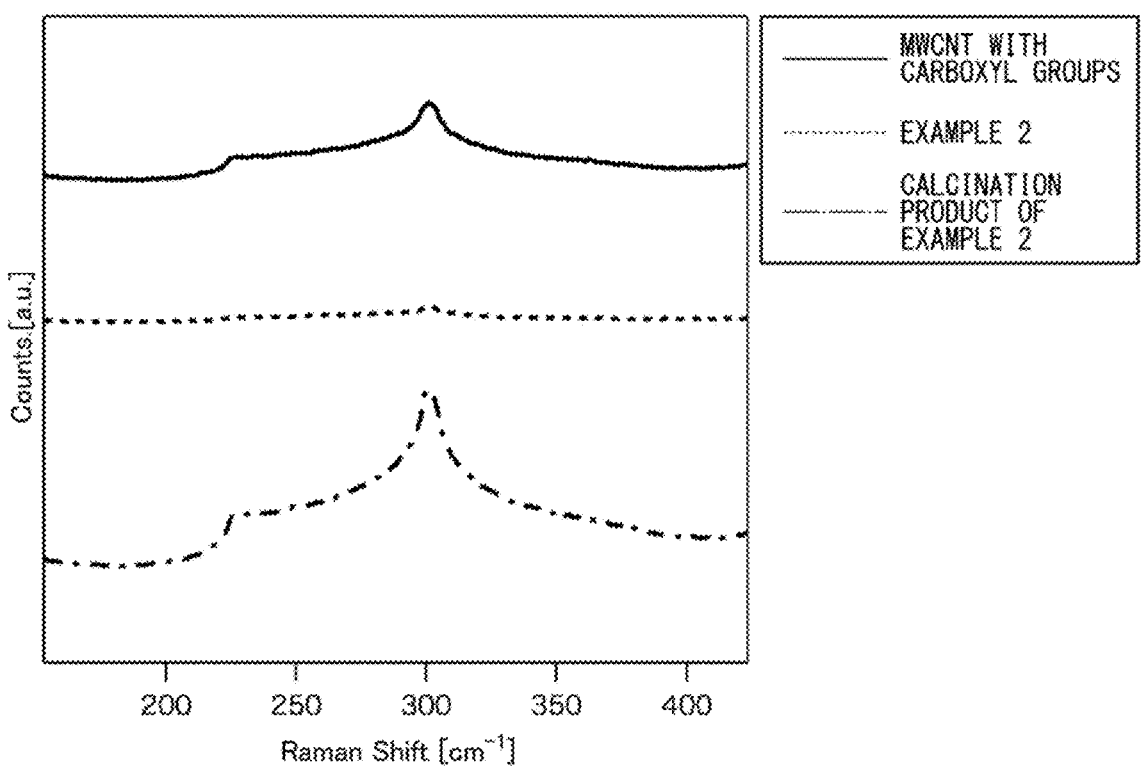
FIG. 7 illustrates an enlarged view of FIG. 6.
Figure 8:
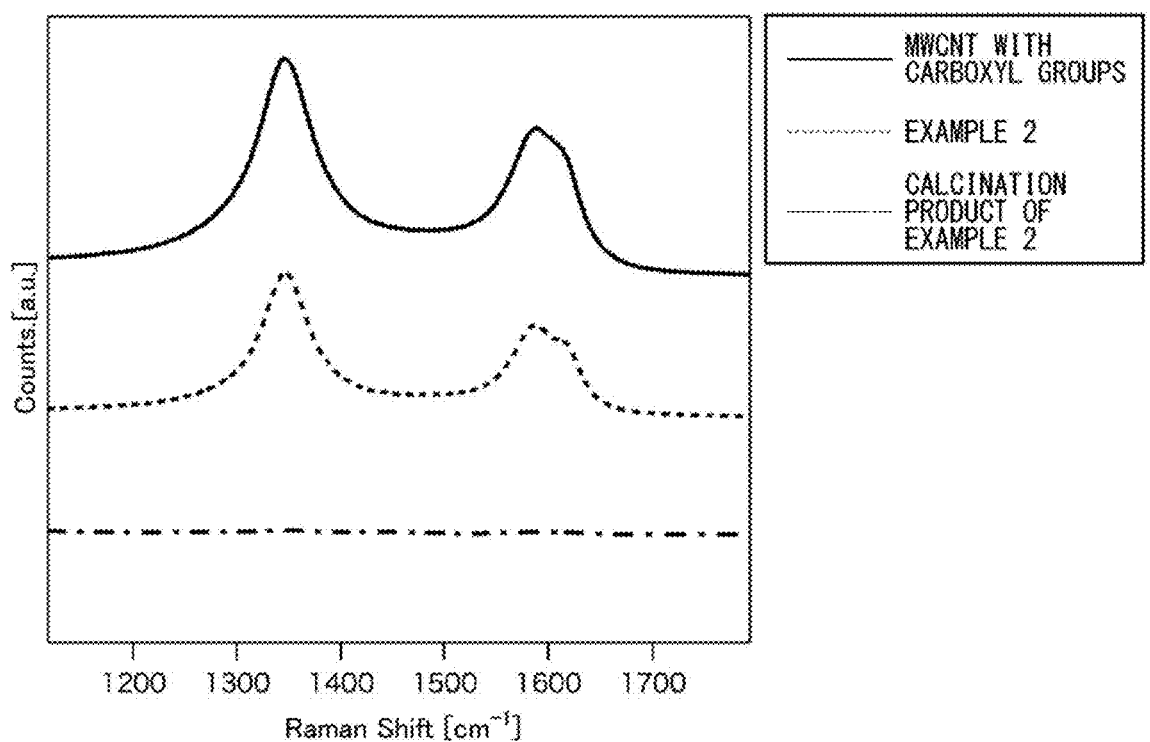
FIG. 8 illustrates an enlarged view of FIG. 6.

FIG. 6 illustrates a graph showing the results obtained by laser Raman spectroscopic analysis in Example 2. FIGS. 7 and 8 illustrate enlarged views of FIG. 6.

The lines indicated by "Example 2" in FIGS. 6 to 8 show spectra of the methanol dispersion of Example 2.

The lines indicated by "calcination product of Example 2" in FIGS. 6 to 8 show spectra of the solution obtained by dissolving a calcination product of the methanol dispersion of Example 2 in DMSO.

The lines indicated by "MWCNT with carboxyl groups" in FIGS. 6 to 8 show spectra of the solution obtained by dissolving MWCNT in DMSO.

Based on FIGS. 6 to 8, the peak intensity ratio R was calculated using equation (8). The peak intensity ratio R of CNT/FeTPP was 1.6, the peak intensity ratio R of CNT/FeTPP calcination was 1.5, and the peak intensity ratio R of CNT was 1.5.

As illustrated in FIG. 7, a peak characteristic of a carbon nanotube was observed in the spectrum of the methanol dispersion of Example 2. Accordingly, it was identified that the chemical structure of MWCNT is maintained in the methanol dispersion of Example 2.

From the spectral result of the calcination product of the methanol dispersion of Example 2 shown in FIG. 8, it was assumed that the chemical structure of FeTPP in the catalyst of Example 2 may be affected due to oxidation caused by calcination.

Figure 9:
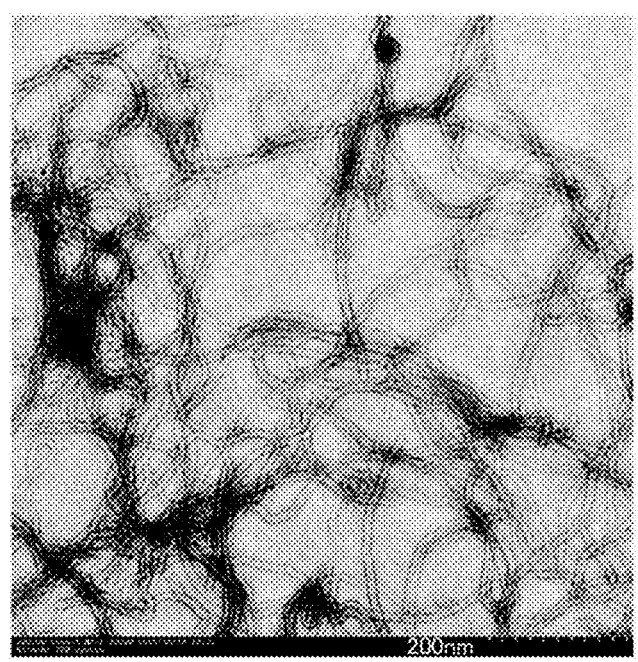
FIG. 9 illustrates a TEM-observed image of the methanol dispersion of Example 2.
Figure 10:
FIG. 10 illustrates an enlarged view of FIG. 9.

FIG. 9 illustrates a TEM-observed image of the methanol dispersion of Example 2. FIG. 10 illustrates an enlarged view of FIG. 9.

Figure 11:
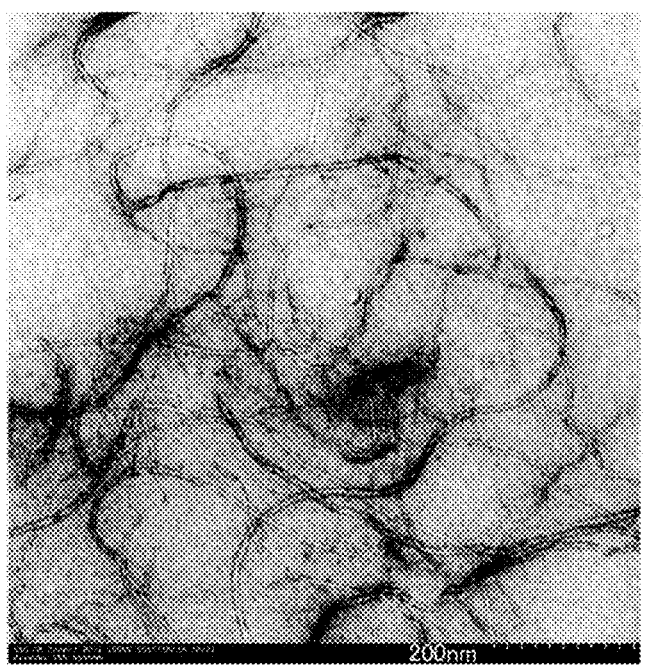
FIG. 11 illustrates a TEM-observed image of MWCNT.
Figure 12:
FIG. 12 illustrates an enlarged view of FIG. 11.

FIG. 11 illustrates a TEM-observed image of MWCNT. FIG. 11 is a comparison target of FIG. 9. FIG. 12 illustrates an enlarged view of FIG. 11.

Figure 13:
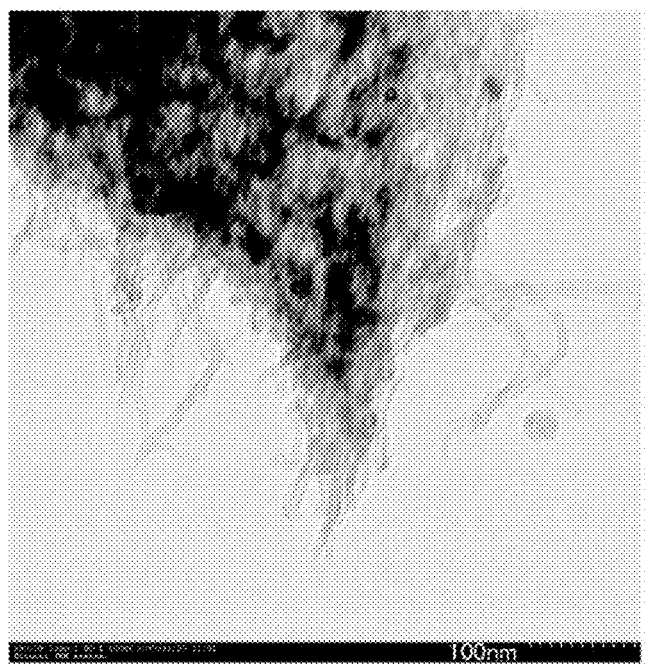
FIG. 13 illustrates a TEM-observed image of a calcination product of the methanol dispersion of Example 2.
Figure 14:
FIG. 14 illustrates an enlarged view of FIG. 13.

FIG. 13 illustrates a TEM-observed image of a calcination product of the methanol dispersion of Example 2. FIG. 14 illustrates an enlarged view of FIG. 13.

In FIG. 9, a diameter of the catalyst of Example 2 in the methanol dispersion was calculated, and the diameter was 14.3±1.8 nm. On the other hand, in FIG. 11, a diameter of MWCNT was measured, and the diameter was 8.7±1.1 nm. From this result, it was identified that a catalyst containing FeTPP and MWCNT is obtained. In addition, as illustrated in FIG. 10, it was suggested that in the catalyst of Example 2, a layer containing FeTPP (FeTPP layer) is provided on the surface of MWCNT. It was assumed that the FeTPP layer has a thickness of about 2.8 nm.

In addition, from the results shown in FIGS. 13 and 14, it was identified that the chemical structure of FeTPP in the catalyst of Example 2 is affected by calcination.

Figure 15:
FIG. 15 illustrates a TEM-observed image of the methanol dispersion of Example 2.
Figure 16:
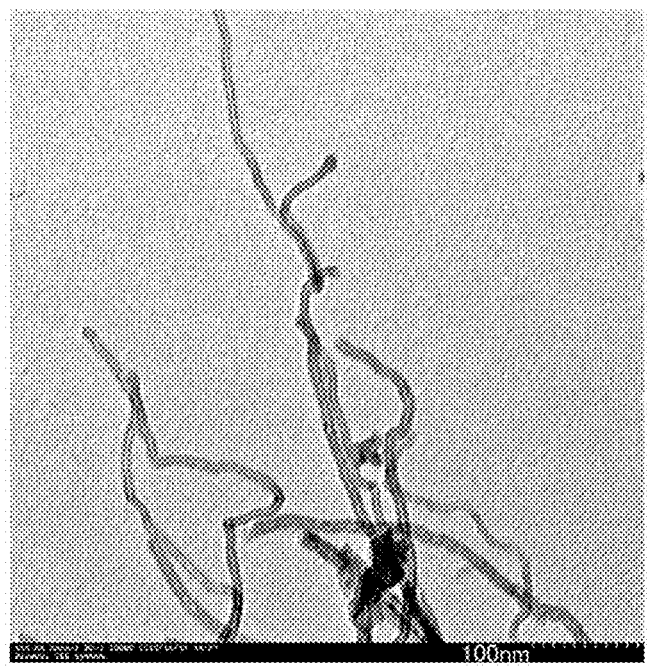
FIG. 16 illustrates a TEM-observed image of MWCNT.

FIG. 15 illustrates a TEM-observed image of the methanol dispersion of Example 2. FIG. 16 illustrates a TEM-observed image of MWCNT. Comparison between FIG. 15 and FIG. 16 suggested that in the catalyst of Example 2, the FeTPP layer is provided on the surface of MWCNT.

Figure 17:
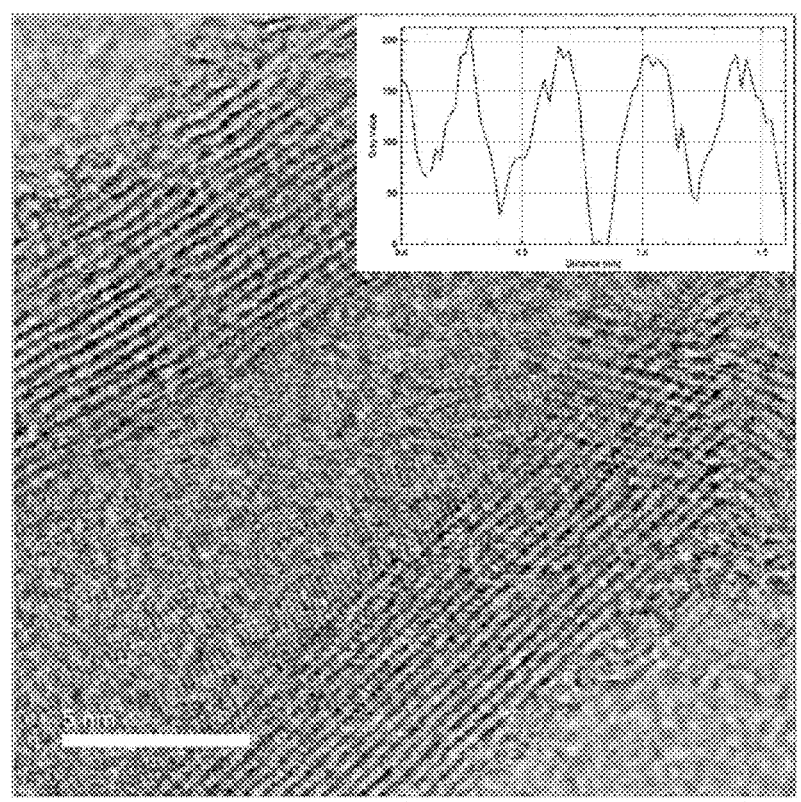
FIG. 17 illustrates a STEM-observed image of the methanol dispersion of Example 2.
Figure 18:
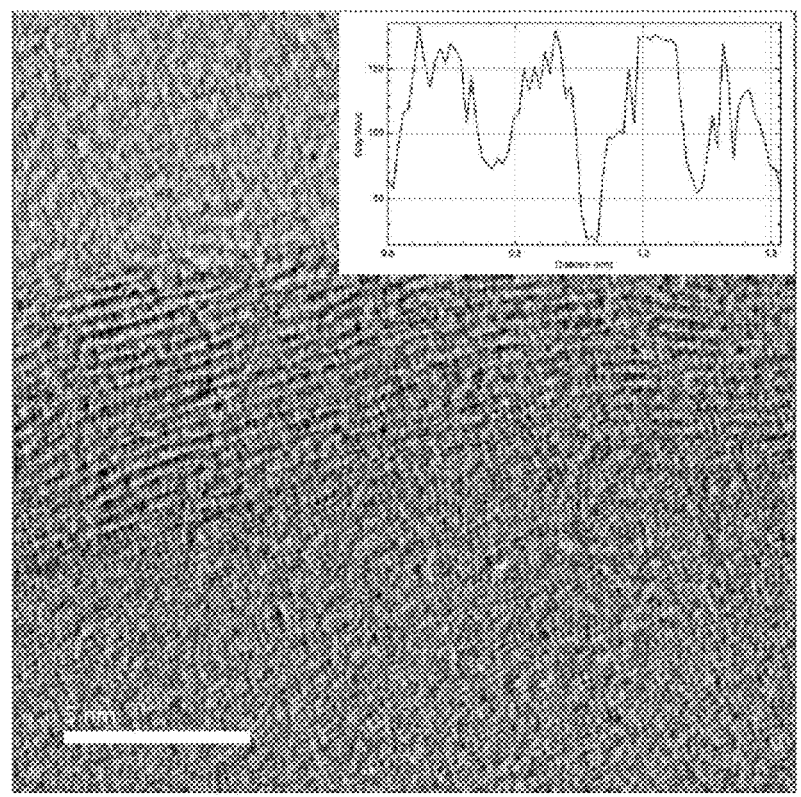
FIG. 18 illustrates a STEM-observed image of MWCNT.

On the other hand, FIG. 17 illustrates a STEM-observed image of the methanol dispersion of Example 2. FIG. 18 illustrates a STEM-observed image of MWCNT. In a case of comparing FIG. 17 with FIG. 18, the FeTPP layer could not be observed in the catalyst of Example 2.

Figure 19:
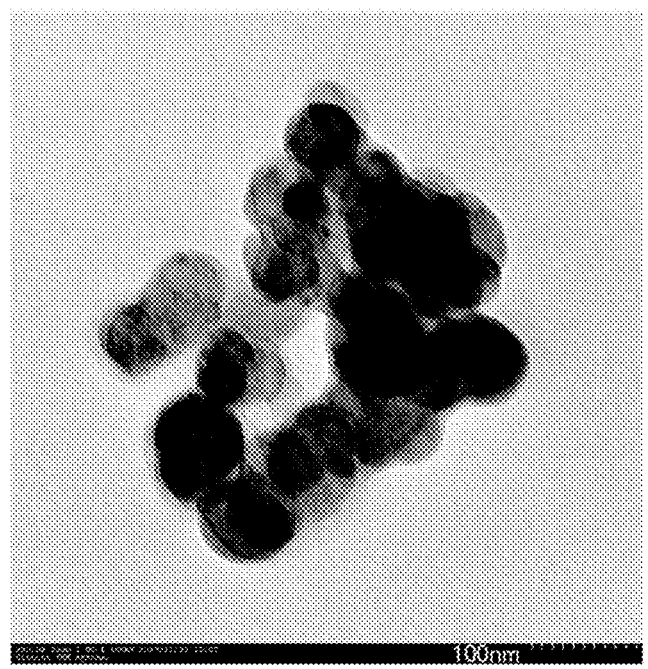
FIG. 19 illustrates a TEM-observed image of the methanol dispersion of Example 3.
Figure 20:
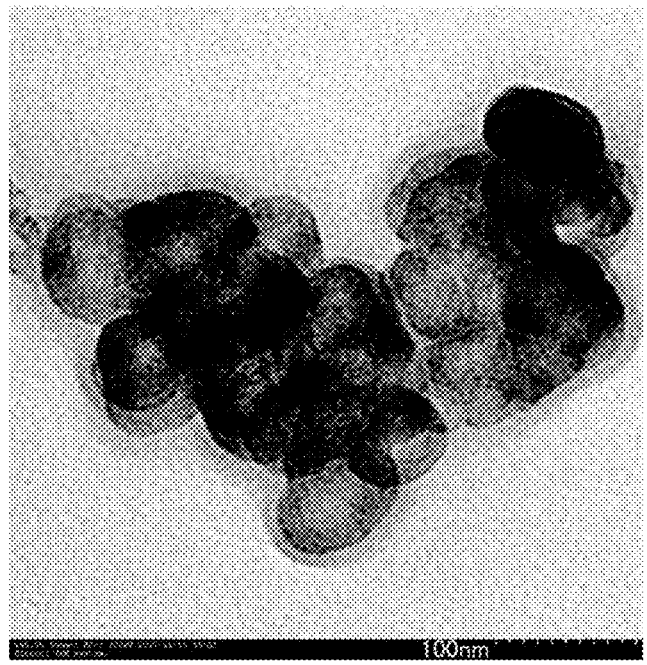
FIG. 20 illustrates an enlarged view of FIG. 19.

FIG. 19 illustrates a TEM-observed image of the methanol dispersion of Example 3. FIG. 20 illustrates an enlarged view of FIG. 19.

Figure 21:
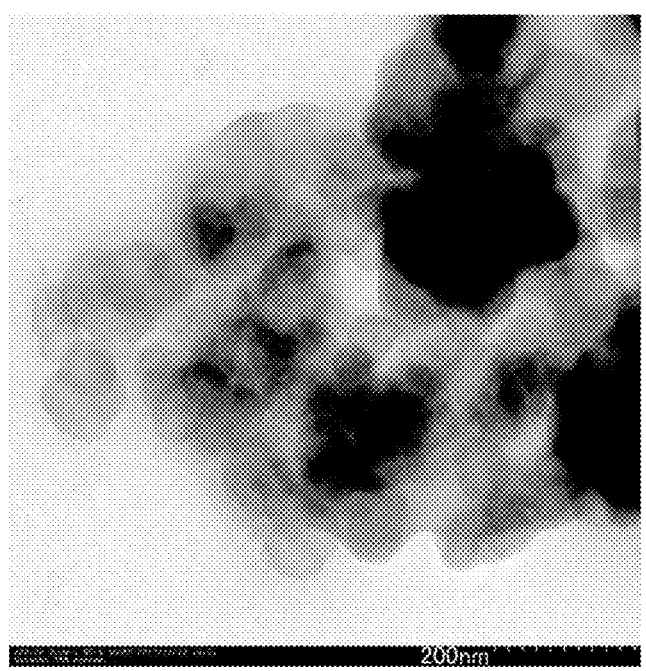
FIG. 21 illustrates a TEM-observed image of CB.
Figure 22:
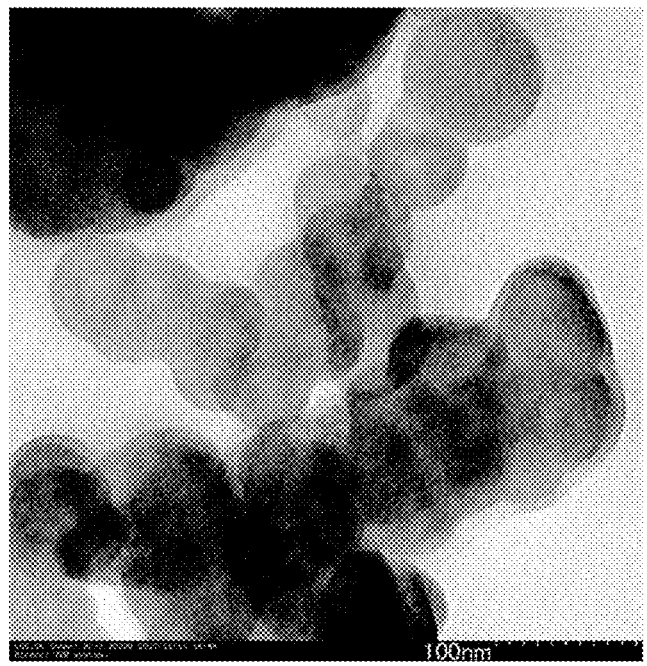
FIG. 22 illustrates an enlarged view of FIG. 21.

FIG. 21 illustrates a TEM-observed image of CB. FIG. 22 illustrates an enlarged view of FIG. 21.

Figure 23:
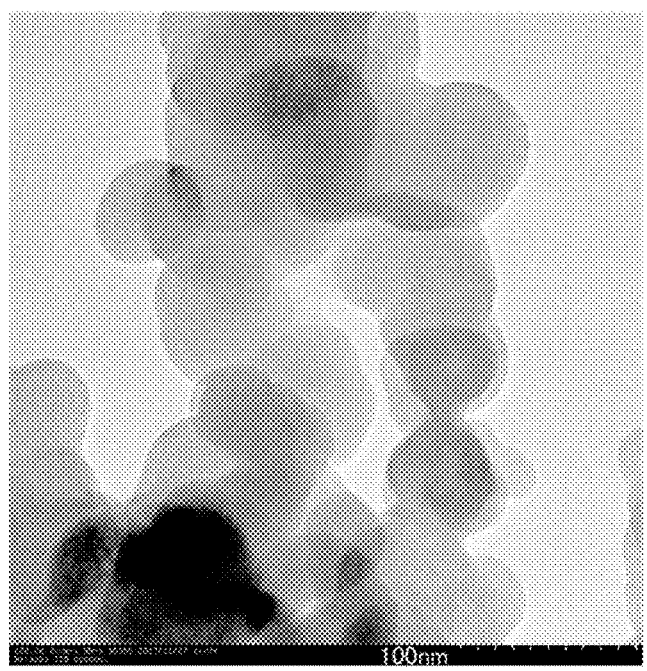
FIG. 23 illustrates a TEM-observed image of a calcination product of the methanol dispersion of Example 3.
Figure 24:
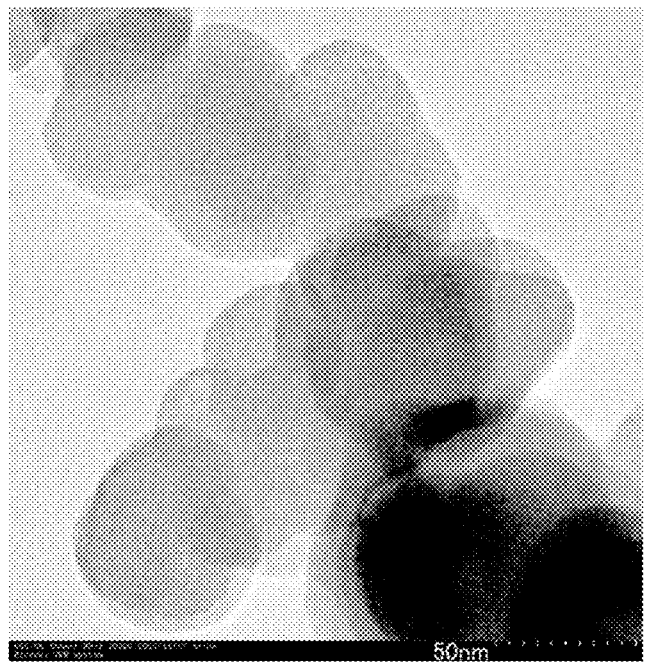
FIG. 24 illustrates an enlarged view of FIG. 23.

FIG. 23 illustrates a TEM-observed image of a calcination product of the methanol dispersion of Example 3. FIG. 24 illustrates an enlarged view of FIG. 23.

Comparison between FIG. 19 (FIG. 20) and FIG. 21 (FIG. 22) suggested that in the catalyst of Example 3, the FeTPP layer is provided on the surface of CB.

In addition, from the results shown in FIGS. 23 and 24, it was identified that the chemical structure of FeTPP in the catalyst of Example 3 is affected by calcination.

Figure 25:
FIG. 25 illustrates a TEM-observed image of the methanol dispersion of Example 4.
Figure 26:
FIG. 26 illustrates an enlarged view of FIG. 25.

FIG. 25 illustrates a TEM-observed image of the methanol dispersion of Example 4. FIG. 26 illustrates an enlarged view of FIG. 25.

Figure 27:
FIG. 27 illustrates a TEM-observed image of GO.
Figure 28:
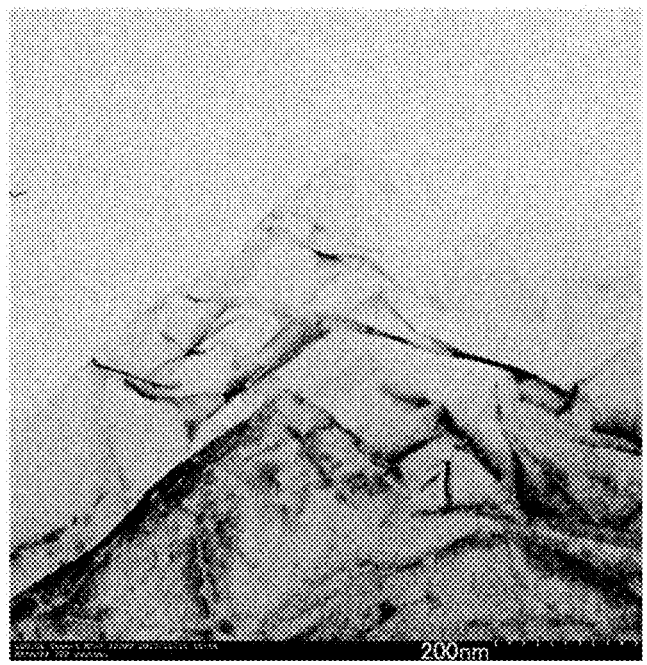
FIG. 28 illustrates an enlarged view of FIG. 27.

FIG. 27 illustrates a TEM-observed image of GO. FIG. 28 illustrates an enlarged view of FIG. 27.

Figure 29:
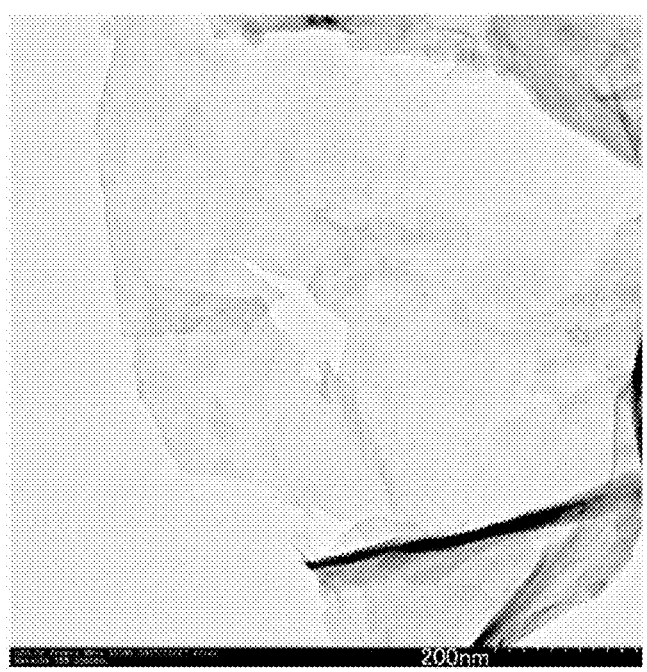
FIG. 29 illustrates a TEM-observed image of a calcination product of the methanol dispersion in Example 4.
Figure 30:
FIG. 30 illustrates an enlarged view of FIG. 29.

FIG. 29 illustrates a TEM-observed image of a calcination product of the methanol dispersion in Example 4. FIG. 30 illustrates an enlarged view of FIG. 29.

Comparison between FIG. 25 (FIG. 26) and FIG. 27 (FIG. 28) suggested that in the catalyst of Example 4, the FeTPP layer is provided on the surface of GO.

In addition, from the results shown in FIGS. 29 and 30, it was identified that the chemical structure of FeTPP in the catalyst of Example 4 is affected by calcination.

Figure 31:
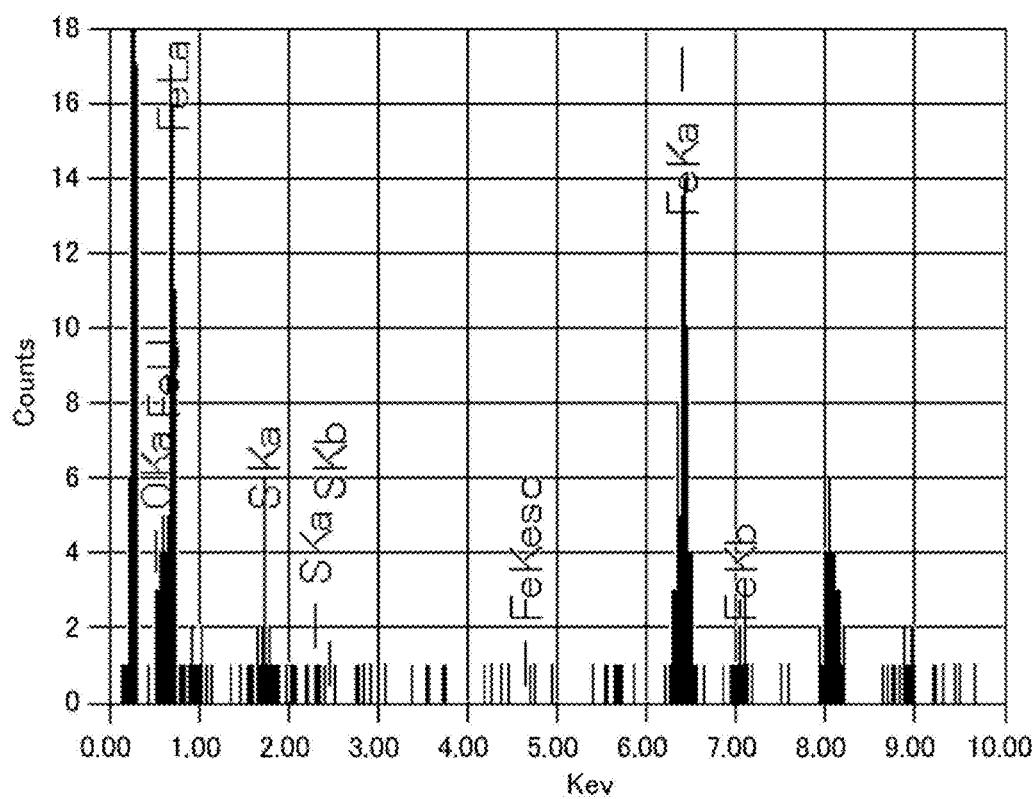
FIG. 31 illustrates a spectrum diagram showing measurement results obtained by EDX spectral analysis in the catalyst of Example 2.
Figure 32:
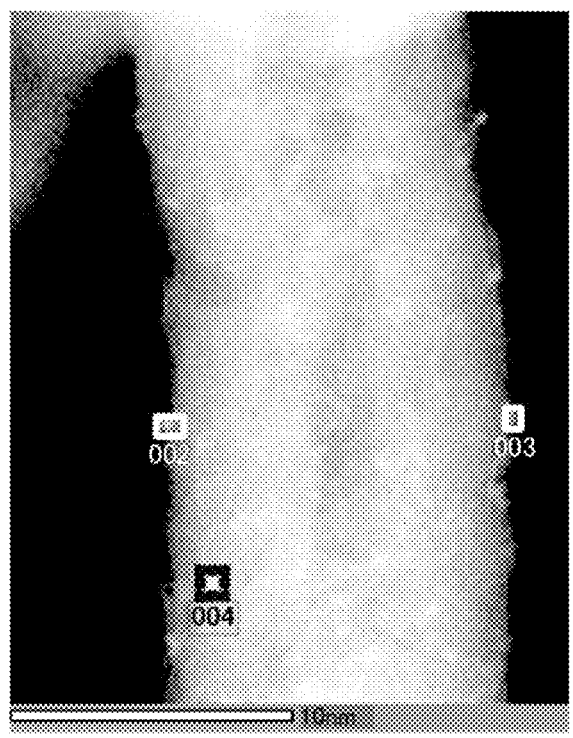
FIG. 32 illustrates an elemental mapping image based on the measurement results shown in FIG. 31.

FIG. 31 illustrates a spectrum diagram showing the measurement results obtained by EDX spectral analysis in the catalyst of Example 2. FIG. 32 illustrates an elemental mapping image based on the measurement results shown in FIG. 31.

Figure 33:
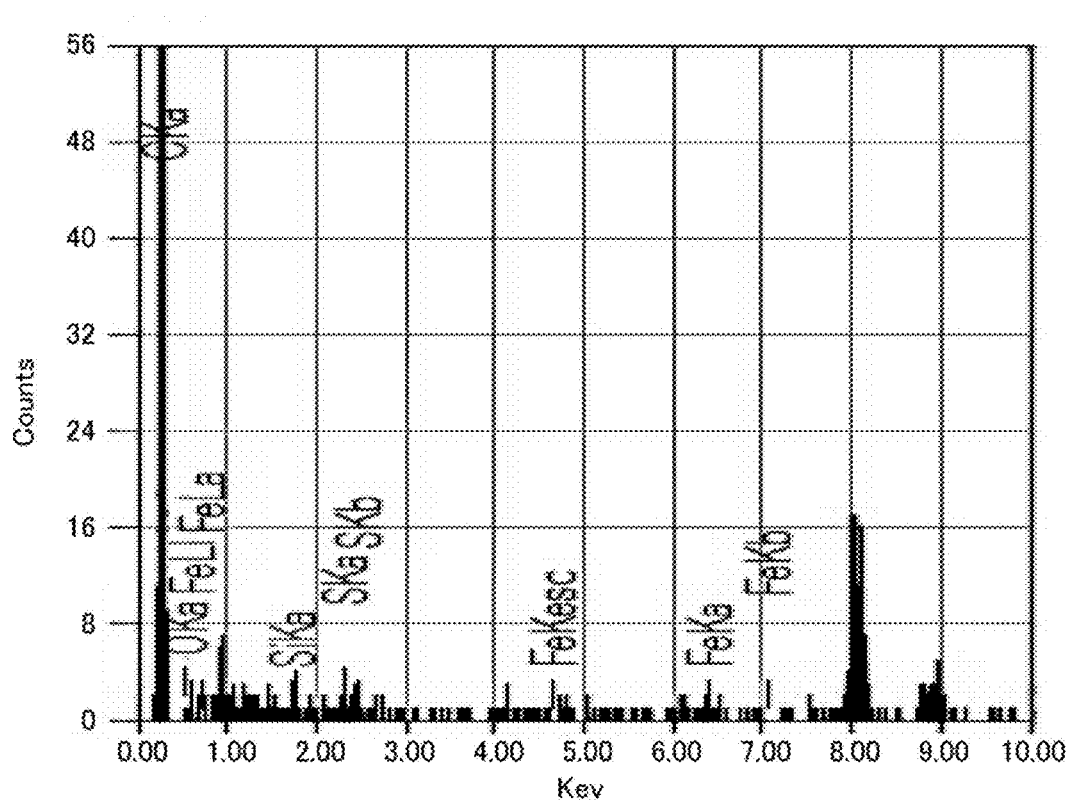
FIG. 33 illustrates a spectrum diagram showing measurement results obtained by EDX spectral analysis in MWCNT.
Figure 34:
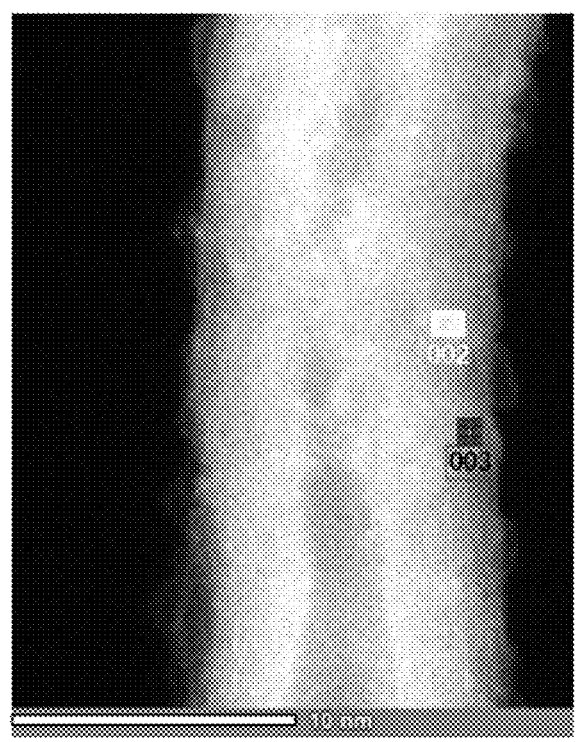
FIG. 34 illustrates an elemental mapping image based on the measurement results shown in FIG. 33.

FIG. 33 illustrates a spectrum diagram showing measurement results obtained by EDX spectral analysis in MWCNT. FIG. 34 illustrates an elemental mapping image based on the measurement results shown in FIG. 33.

As indicated by "FeKa" in FIG. 31, an iron atom-derived peak was observed. On the other hand, as illustrated in FIG. 33, no iron atom-derived peak was observed in MWCNT.

In a case of comparing FIG. 32 with FIG. 34, it was identified that in FIG. 32, a coating layer containing FeTPP is formed on the surface of MWCNT. Meanwhile, the respective numbers "002", "003", and "004" in FIG. 32 show regions where spectral measurement has been performed. In FIG. 34, the same applies to the numbers indicated by "002" and "003."

Figure 35:
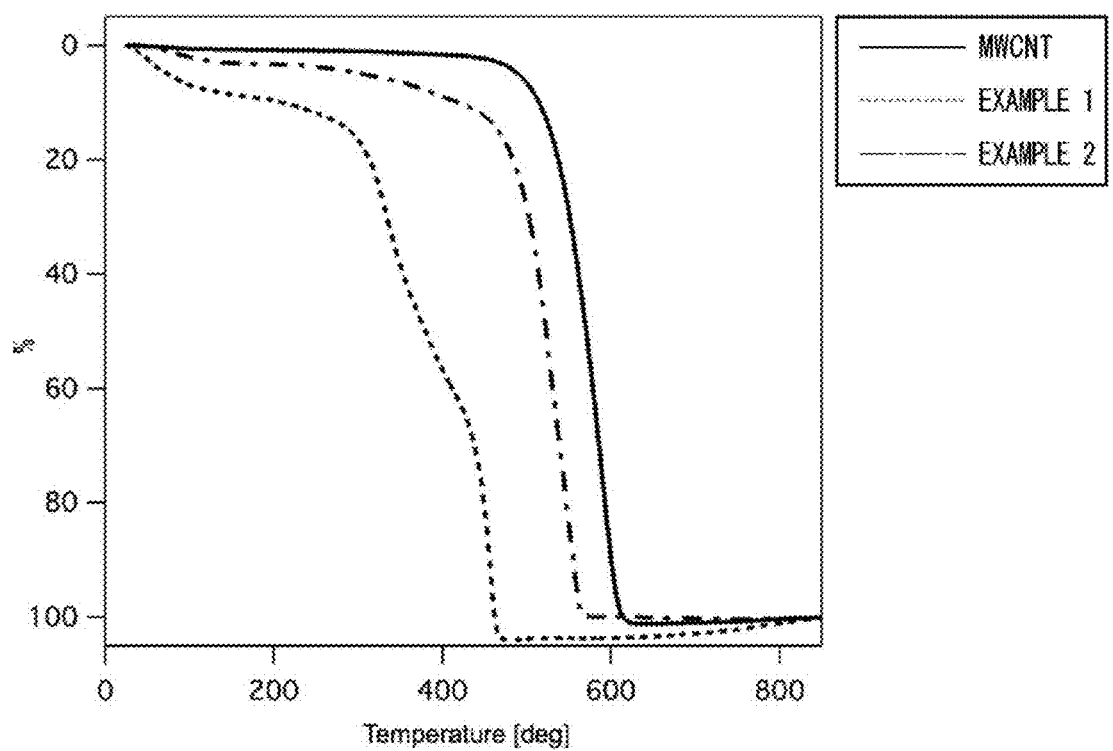
FIG. 35 illustrates a graph showing measurement results obtained by TG-DTA.
Figure 36:
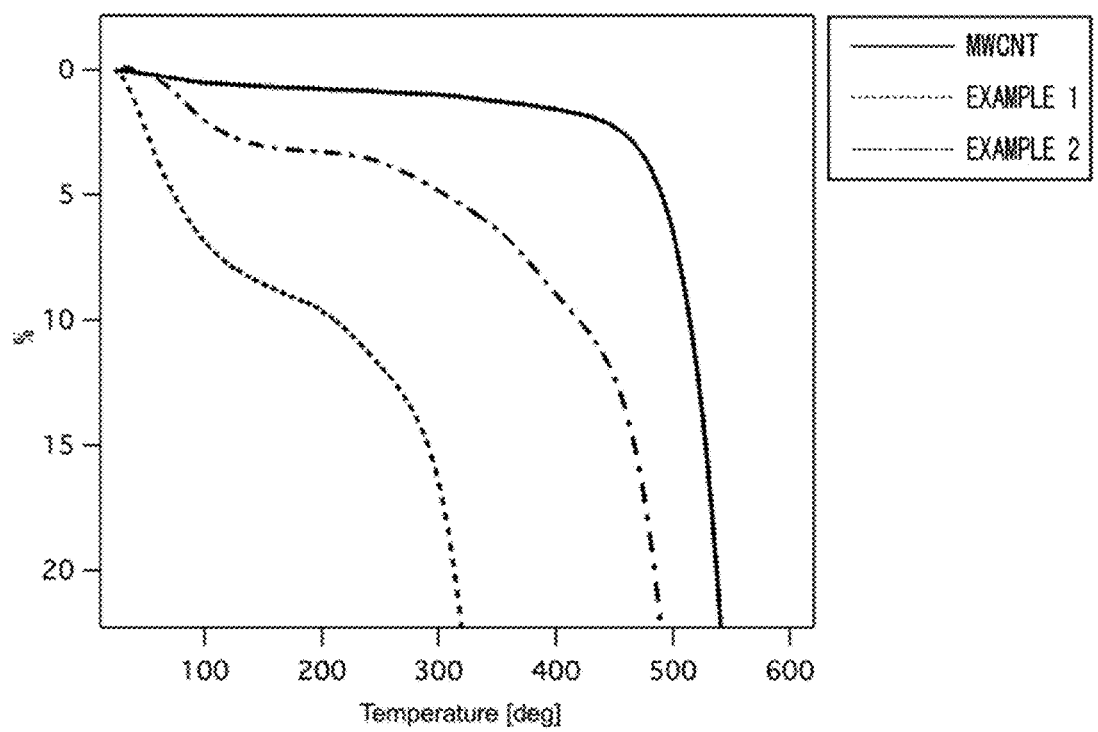
FIG. 36 illustrates an enlarged view of FIG. 35.

FIG. 35 illustrates a graph showing the measurement results obtained by TG-DTA. In FIG. 35, an amount of mass reduction is plotted on the vertical axis. FIG. 36 illustrates an enlarged view of FIG. 35.

Figure 37:
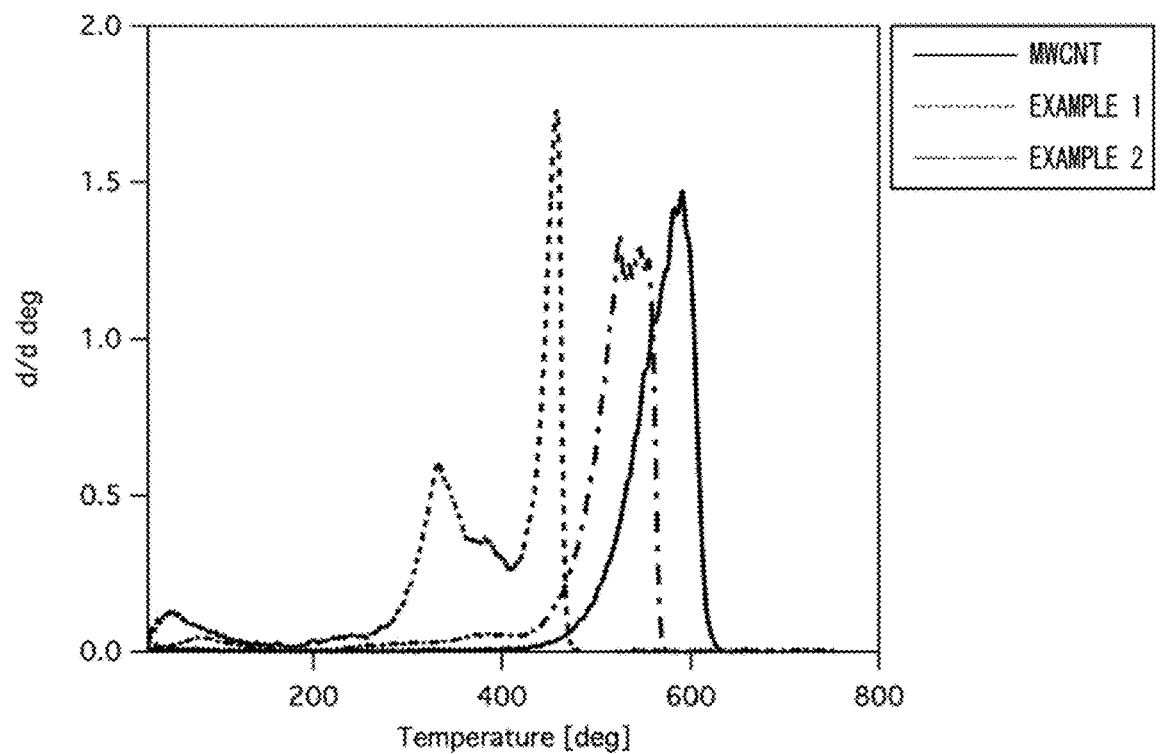
FIG. 37 illustrates a graph showing measurement results obtained by TG-DTA.
Figure 38:
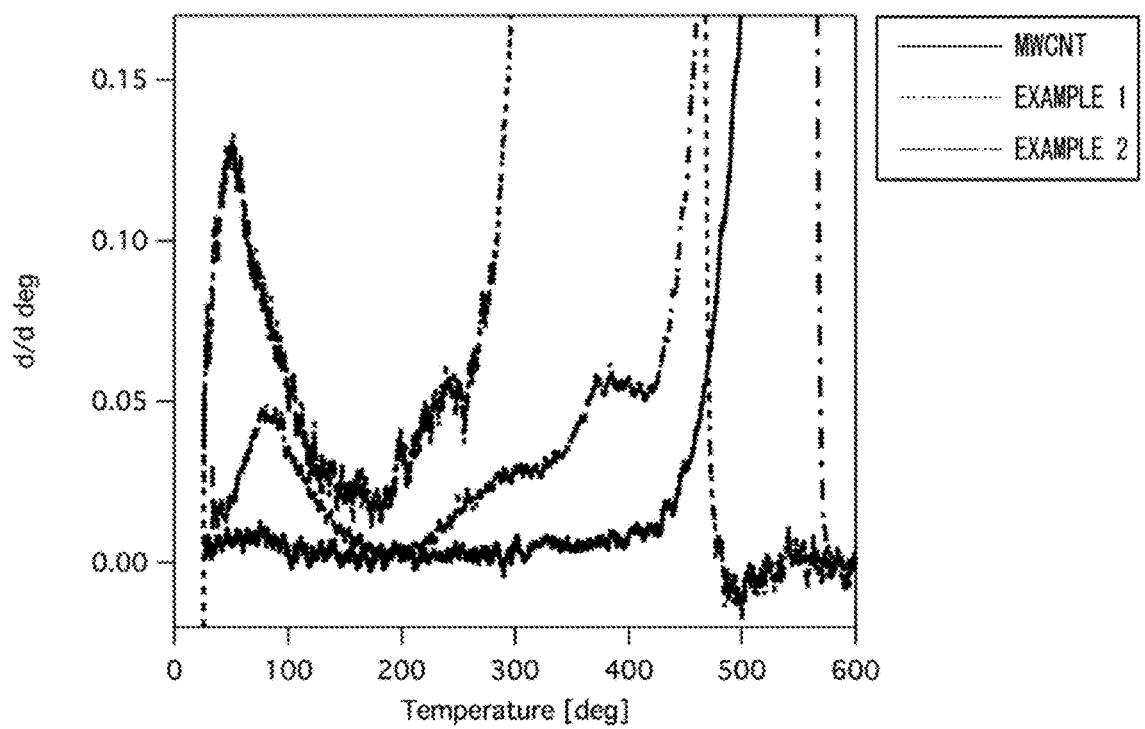
FIG. 38 illustrates an enlarged view of FIG. 37.

FIG. 37 illustrates a graph showing the measurement results obtained by TG-DTA. In FIG. 37, a temperature derivative of an amount of mass reduction is plotted on the vertical axis. FIG. 38 illustrates an enlarged view of FIG. 37.

In FIGS. 35 to 38, the lines indicated by "Example 1" show the measurement results of TG-DTA in FeTPP of Example 1.

In FIGS. 35 to 38, the lines indicated by "Example 2" show the measurement results of TG-DTA in the methanol dispersion of Example 2.

In FIGS. 35 to 38, the lines indicated by "MWCNT" show the measurement results of TG-DTA in MWCNT.

From the results shown in FIGS. 35 to 38, it was found that in the methanol dispersion of Example 2, about 5% by mass of FeTPP is contained and about 3% by mass of DMSO remains.

(Fabrication of Electrodes)

2 mg of the catalyst of Example 2 and 1 mg of Milli-Q water were kneaded with an ultrasonic stirrer and applied to a glassy carbon electrode. To the glassy carbon electrode was further applied 5 μL of 0.5% (by mass) Nafion aqueous solution, to obtain the electrode of Example 2.

The electrode of Example 3 was obtained in the same manner as for the electrode of Example 2, except that the catalyst of Example 3 is used in place of the catalyst of Example 2.

The electrode of Example 5 was obtained in the same manner as for the electrode of Example 2, except that the catalyst of Example 5 is used in place of the catalyst of Example 2.

The electrode of Comparative Example 1 was obtained in the same manner as for the electrode of Example 2, except that 2 mg of the calcination product of the catalyst of Example 2 is used in place of the catalyst of Example 2.

The Pt/C electrode was obtained in the same manner as for the electrode of Example 2, except that Pt/C is used in place of the catalyst of Example 2.

The CNT electrode was obtained in the same manner as for the electrode of Example 2, except that MWCNT is used in place of the catalyst of Example 2.

Figure 39:
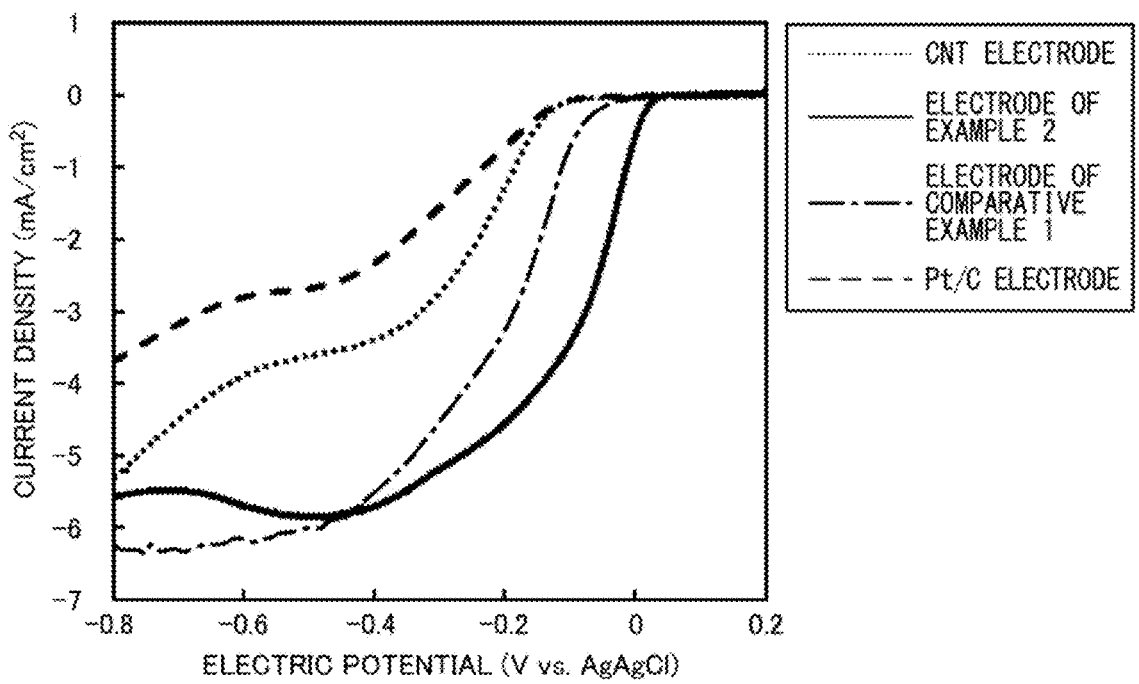
FIG. 39 illustrates a diagram showing a comparison of LSV curves obtained by using, as a working electrode, each of the electrode of Example 2, the electrode of Comparative Example 1, a Pt/C electrode, and a CNT electrode.

FIG. 39 illustrates a diagram showing a comparison of LSV curves obtained by using, as a working electrode, each of the electrode of Example 2, the electrode of Comparative Example 1, the Pt/C electrode, and the CNT electrode. As illustrated in FIG. 39, it was found that the electrode of Example 2 exhibits a saturation current value equivalent to that of the Pt/C electrode.

Figure 40:
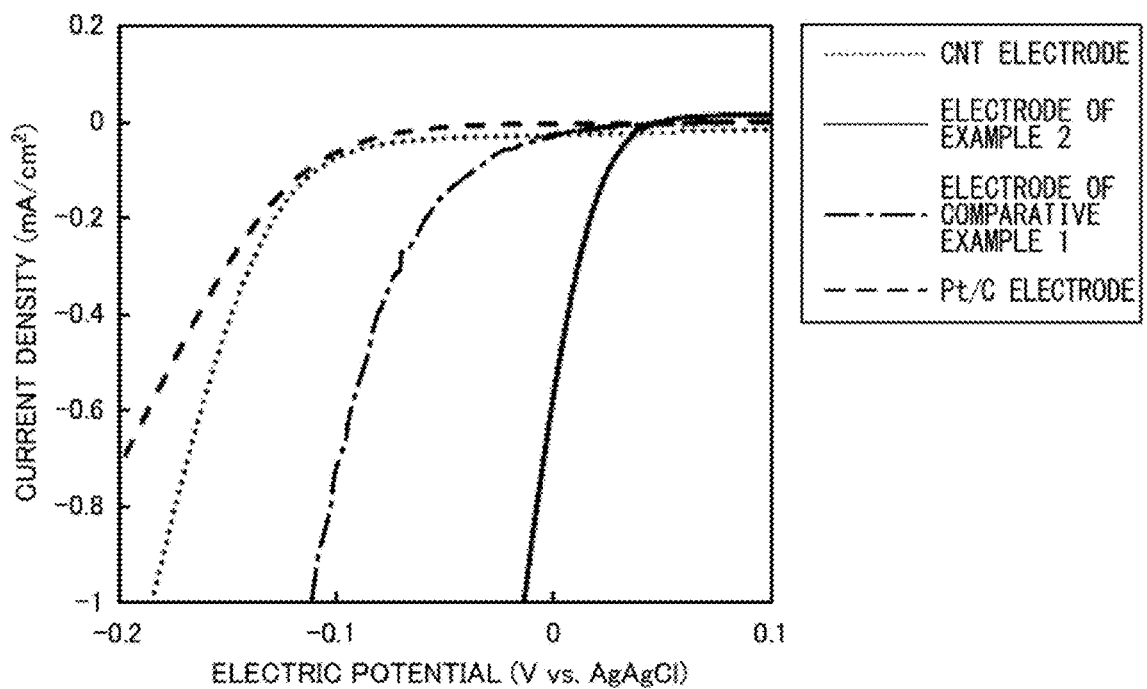
FIG. 40 illustrates an enlarged view of FIG. 39.

FIG. 40 illustrates an enlarged view of FIG. 39. As illustrated in FIG. 40, in the electrode of Example 2, the electric potential at which oxygen reduction reaction starts was higher than that of the Pt/C electrode. The average number of reaction electron was 3.4 electrons for the electrode of Example 2, 3.0 electrons for the electrode of Comparative Example 1, 3.7 electrons for the Pt/C electrode, and 3.2 electrons for the CNT electrode. From these results, it was found that the electrode of Example 2 has oxygen reduction catalytic ability surpassing that of the Pt/C electrode. In addition, in Comparative Example 1, the calcination product of the catalyst of Example 2 is considered to have lost the chemical structure of FeTPP, which was originally possessed by the catalyst of Example 2, due to an effect of calcination. Therefore, it is considered that the electrode of Comparative Example 1 did not exhibit the oxygen reduction catalytic ability surpassing that of the Pt/C electrode.

Figure 41:
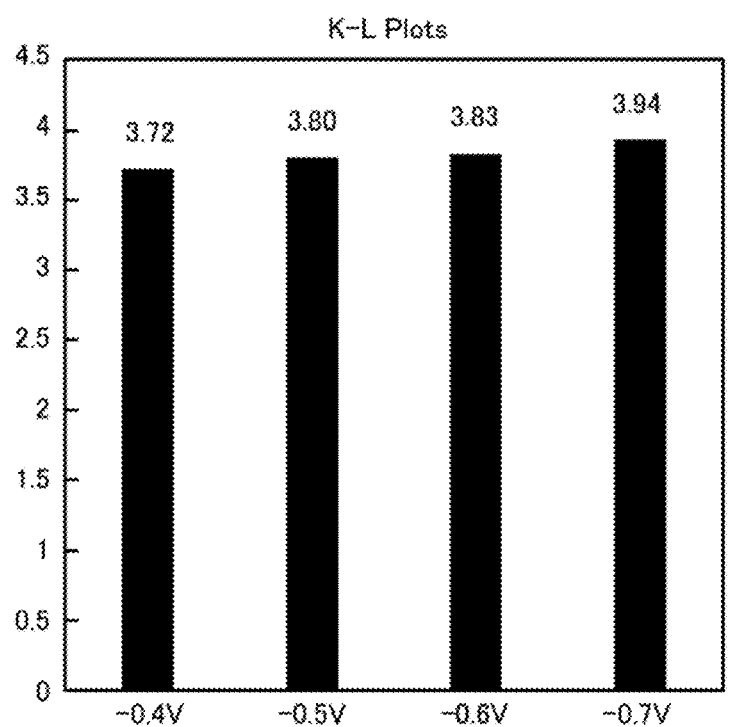
FIG. 41 illustrates a graph showing results obtained by calculating the number of reaction electrons based on a K-L plot in the electrode of Example 2.
Figure 42:
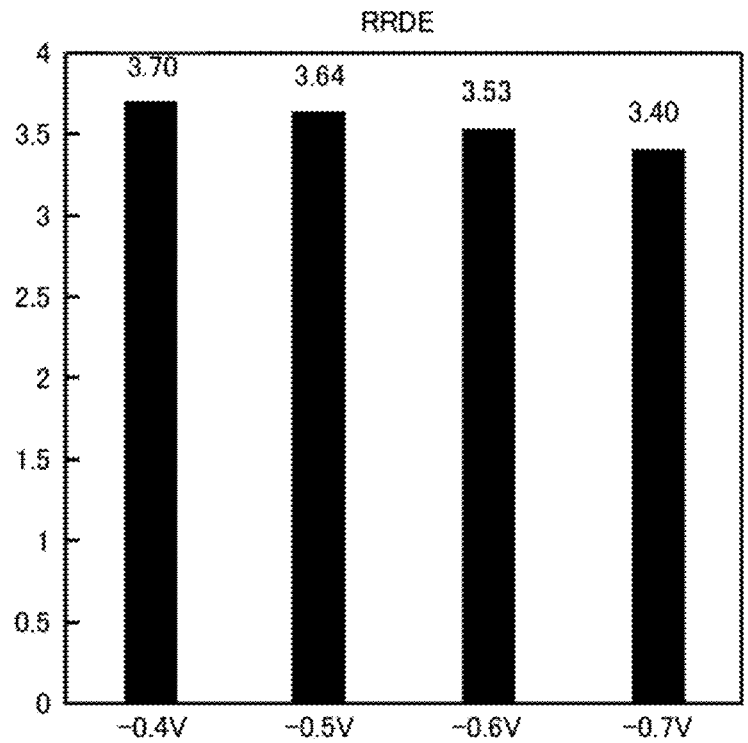
FIG. 42 illustrates a graph showing results obtained by calculating the number of reaction electrons based on RRDE in the electrode of Example 2.

FIG. 41 illustrates a graph showing the results obtained by calculating the number of reaction electrons based on a K-L plot in the electrode of Example 2. FIG. 42 illustrates a graph showing the results obtained by calculating the number of reaction electrons based on RRDE in the electrode of Example 2.

Figure 43:
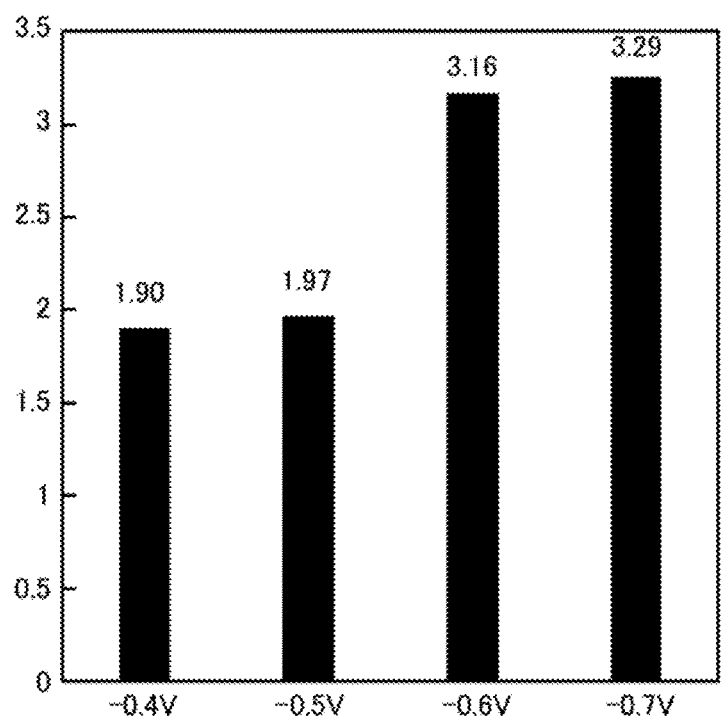
FIG. 43 illustrates a graph showing results obtained by calculating the number of reaction electrons based on a K-L plot in the CNT electrode.
Figure 44:
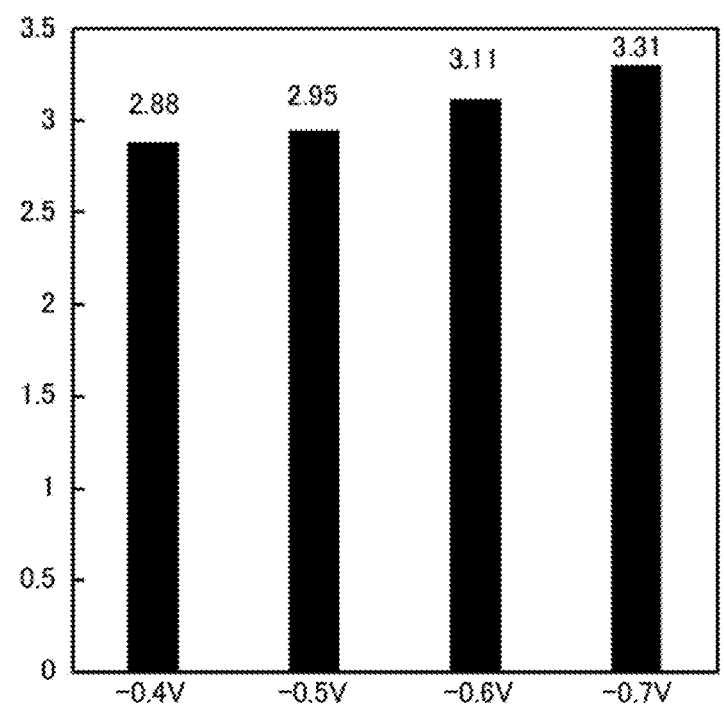
FIG. 44 illustrates a graph showing results obtained by calculating the number of reaction electrons based on RRDE in the CNT electrode.

On the other hand, FIG. 43 illustrates a graph showing the results obtained by calculating the number of reaction electrons based on a K-L plot in the CNT electrode. FIG. 44 illustrates a graph showing the results obtained by calculating the number of reaction electrons based on RRDE in the CNT electrode.

As illustrated in FIGS. 41 to 44, it was identified that the number of reaction electrons increases in the electrode of Example 2 no matter which method is used to calculate the number of reaction electron.

Figure 45:
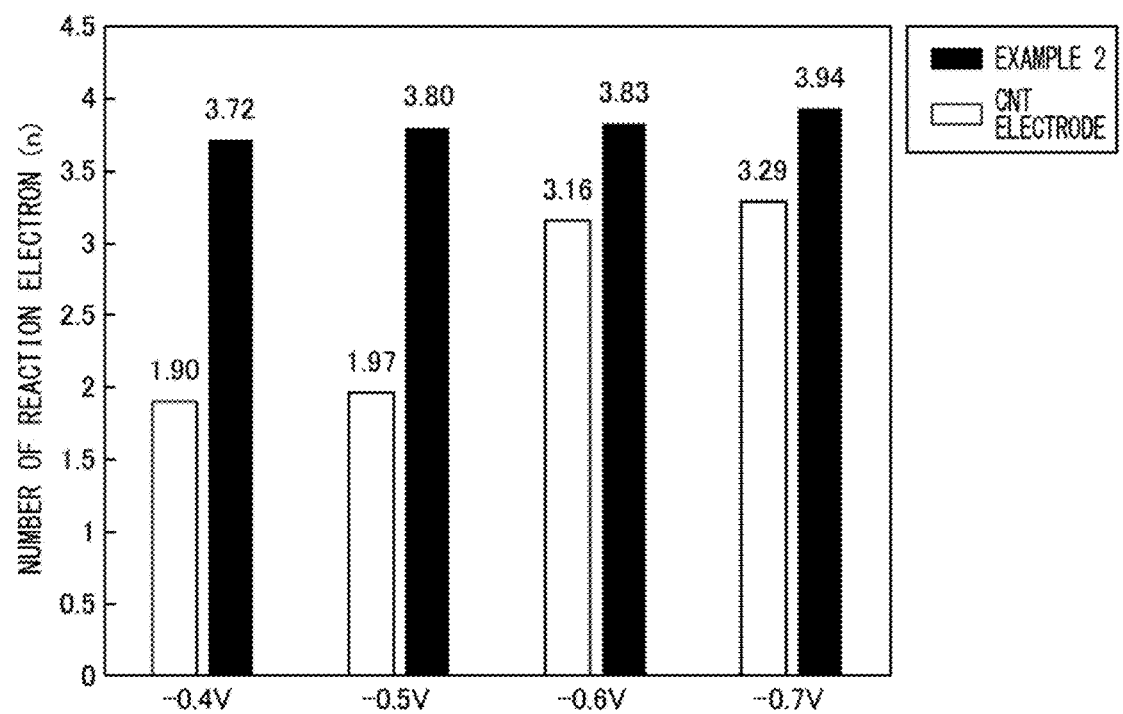
FIG. 45 illustrates a graph showing a comparison of results obtained by calculating the number of reaction electrons based on a K-L plot, in the electrode of Example 2 and the CNT electrode.
Figure 46:
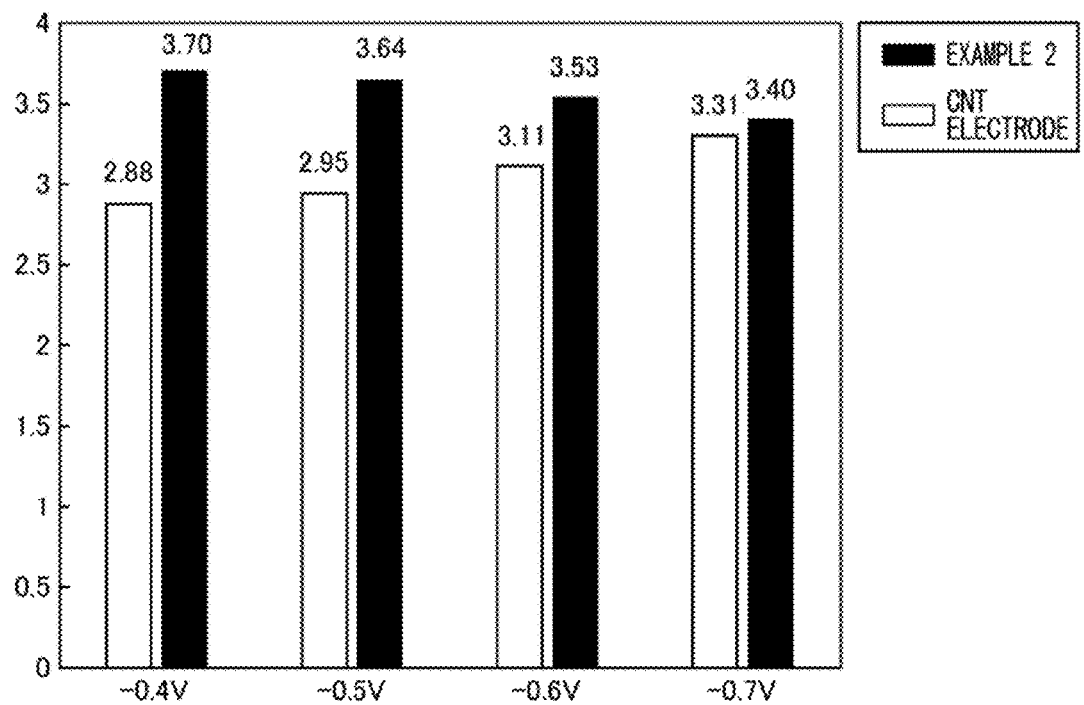
FIG. 46 illustrates a graph showing a comparison of results obtained by calculating the number of reaction electrons based on RRDE, in the electrode of Example 2 and the CNT electrode.

FIG. 45 illustrates a graph showing a comparison of results obtained by calculating the number of reaction electrons based on a K-L plot, in the electrode of Example 2 and the CNT electrode. FIG. 46 illustrates a graph showing a comparison of results obtained by calculating the number of reaction electrons based on RRDE, in the electrode of Example 2 and the CNT electrode.

Even from the results of FIGS. 45 and 46, it was identified that the number of reaction electrons increases in the electrode of Example 2 no matter which method is used to calculate the number of reaction electron.

(Methanol Crossover)

Methanol crossover was evaluated at a condition in which 3.0 M methanol is added to 0.1 M KOH electrolyte and a rotation speed is set to 2,400 rpm.

Figure 47:
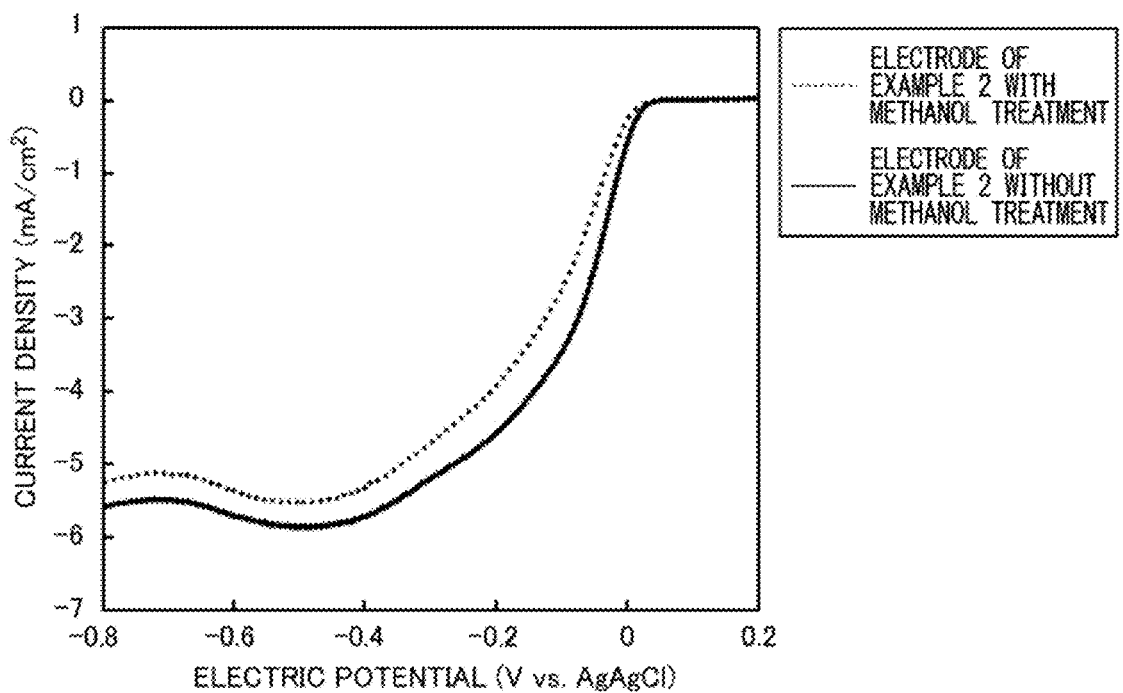
FIG. 47 illustrates a graph showing results obtained by evaluating methanol crossover in the electrode of Example 2.

FIG. 47 illustrates a graph showing the results obtained by evaluating methanol crossover in the electrode of Example 2. In FIG. 47, the curve indicated by "electrode of Example 2 without methanol treatment" shows an LSV curve measured without addition of methanol to the electrolytic solution, and the curve indicated by "electrode of Example 2 with methanol treatment" shows an LSV curve measured with addition of 3.0 M methanol to the electrolytic solution.

Figure 48:
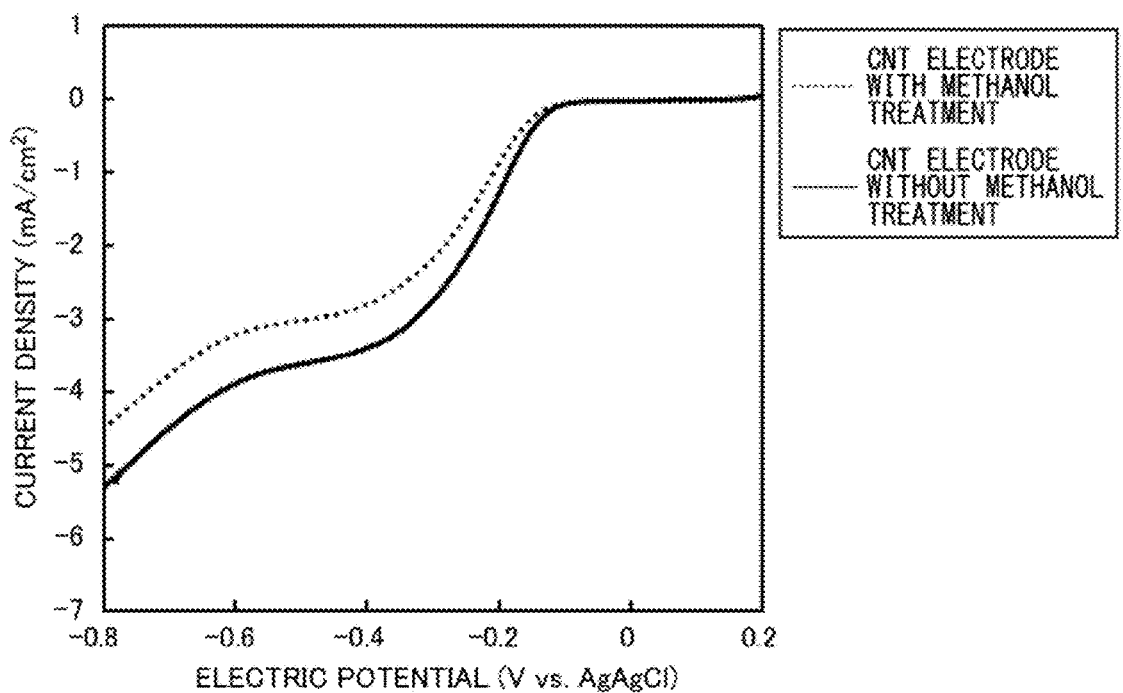
FIG. 48 illustrates a graph showing results obtained by evaluating methanol crossover in the CNT electrode.

FIG. 48 illustrates a graph showing the results obtained by evaluating methanol crossover in the CNT electrode. In FIG. 48, the curve indicated by "CNT electrode without methanol treatment" shows an LSV curve measured without addition of methanol to the electrolytic solution, and the curve indicated by "CNT electrode with methanol treatment" shows an LSV curve measured with addition of 3.0 M methanol to the electrolytic solution.

As illustrated in FIGS. 47 and 48, in both the electrode of Example 2 and the CNT electrode, decreased current density was observed in a case where methanol is added to the electrolytic solution. However, comparison between FIGS. 47 and 48 shows the results that the electrode of Example 2 exhibited a smaller amount of current density reduction than that of the CNT electrode and the electrode of Example 2 was better than the CNT electrode in terms of evaluation of methanol crossover.

It is generally known that in the Pt/C electrode, oxidation of methanol is likely to occur on the surface of the electrode, and there is an inferior tendency in evaluation of methanol crossover. On the other hand, it was found that in the electrode of Example 2, an electric potential decrease caused by methanol crossover is less likely to occur than in the Pt/C electrode and the CNT electrode.

(Durability)

The electrode of Example 2 was energized for 7,000 seconds by application of 0.7 V and changes with time in current value were measured with CompactStat (MH-COM-PACT, manufactured by Ivium) while using 1.0 M KOH electrolyte as an electrolytic solution, Pt as a counter electrode, and Ag/AgCl as a reference electrode. A relative current (%) was plotted on the vertical axis, in which the current value immediately after the start of energization is set as 100%.

Figure 49:
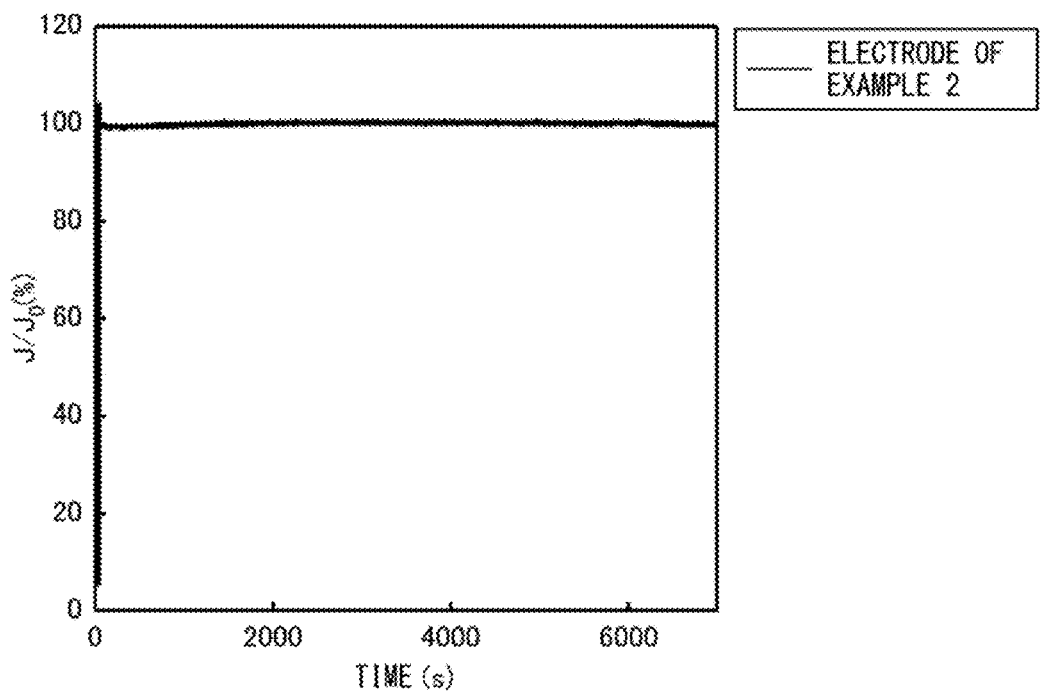
FIG. 49 illustrates a graph showing results obtained by evaluating durability in the electrode of Example 2.

FIG. 49 illustrates a graph showing the results obtained by evaluating durability in the electrode of Example 2.

As illustrated in FIG. 49, the electrode of Example 2 had a relative current of about 100% even after 7,000 seconds had elapsed from the start of energization, suggesting that the electrode has superior durability.

It is described that even after 7,000 seconds has elapsed from the start of energization, the relative current decreases to 73% in the electrode containing a platinum-carrying carbon material described in ACS Catalyst, 2013, 3, 1263, and decreases to 86% in the electrode containing g-FePC. This also suggested that the electrode of Example 2 has superior durability to that of conventional products such as the electrode containing a platinum-carrying carbon material.

Figure 50:
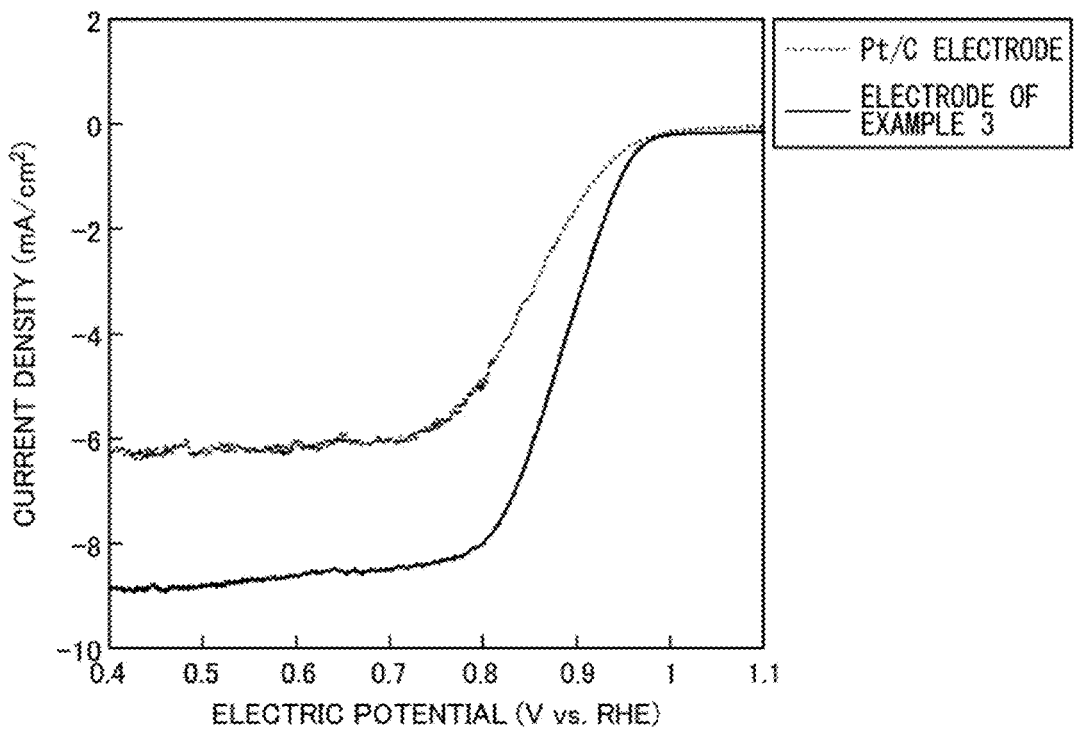
FIG. 50 illustrates a diagram showing a comparison of LSV curves obtained by using, as a working electrode, each of the electrode of Example 3 and the Pt/C electrode.

FIG. 50 illustrates a diagram showing a comparison of LSV curves obtained by using, as a working electrode, each of the electrode of Example 3 and the Pt/C electrode. In the catalyst of Example 3, the carbon material is CB. Even in this case, as illustrated in FIG. 50, it was found that the electrode of Example 3 exhibits a higher saturation current value than the Pt/C electrode. In addition, the electric potential at which oxygen reduction reaction starts was higher than that of the Pt/C electrode. From these results, it was found that the electrode of Example 3 has oxygen reduction catalytic ability surpassing that of the Pt/C electrode.

Figure 51:
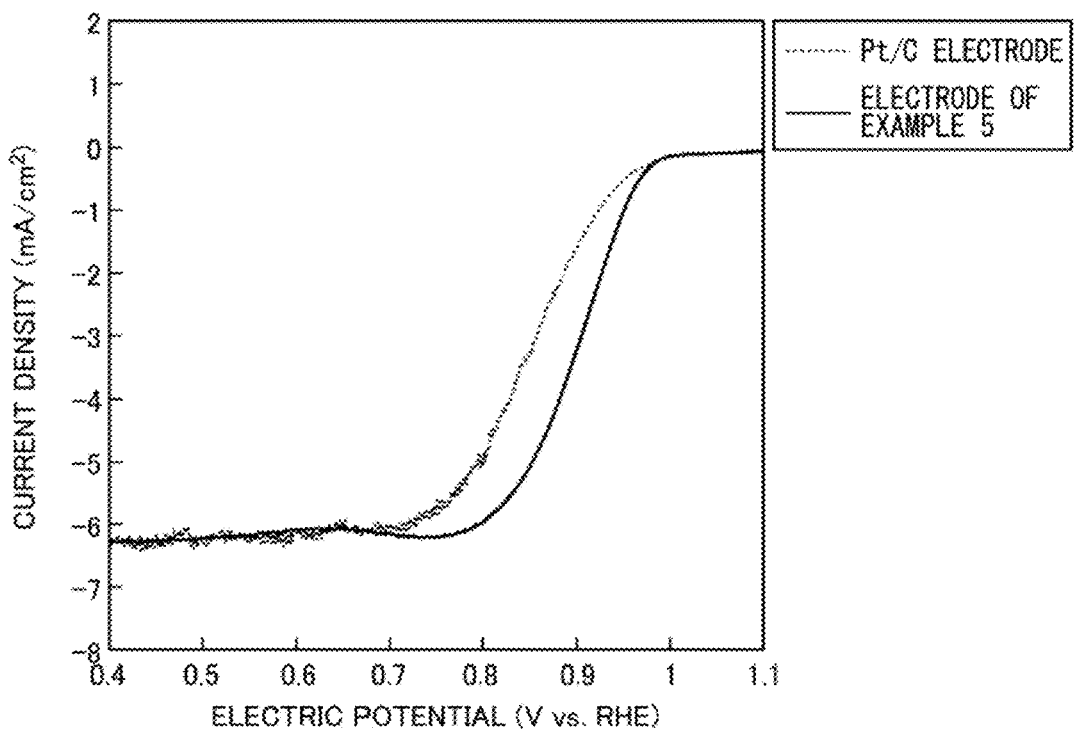
FIG. 51 illustrates a diagram showing a comparison of LSV curves obtained by using, as a working electrode, each of the electrode of Example 5 and the Pt/C electrode.

FIG. 51 illustrates a diagram showing a comparison of LSV curves obtained by using, as a working electrode, each of the electrode of Example 5 and the Pt/C electrode. In the catalyst of Example 5, the structure of the metal complex is represented by formula (9). In this case, as illustrated in FIG. 51, it was found that the electrode of Example 5 exhibits a saturation current value equivalent to that of the Pt/C electrode. In addition, the electric potential at which oxygen reduction reaction starts was higher than that of the Pt/C electrode. From the above, it was found that the electrode of Example 5 has oxygen reduction catalytic ability surpassing that of the Pt/C electrode.

In a case of comparing FIG. 50 with FIG. 51, it can be seen that the electrode of Example 3 has a higher saturation current value than that of the electrode of Example 5. In addition, in the electrode of Example 3, the electric potential at which oxygen reduction reaction starts was higher than that of the electrode of Example 5. From the above, it is considered that as an electrode of a fuel cell or an air battery, the electrode of Example 3 has higher performance than the electrode of Example 5.

From the results of the examples as described above, it was identified that a catalyst has been obtained which has oxygen reduction catalytic ability surpassing that of the platinum-carrying carbon material.

The invention claimed is:

1. A catalyst comprising:
a metal complex represented by formula (1); and
a carbon material, wherein the carbon material is carbon nanotube, carbon black, or graphene, and wherein the carbon material contains a carboxyl group, and a content of the carboxyl group is 20% by mass or less with respect to 100% by mass of the carbon material,

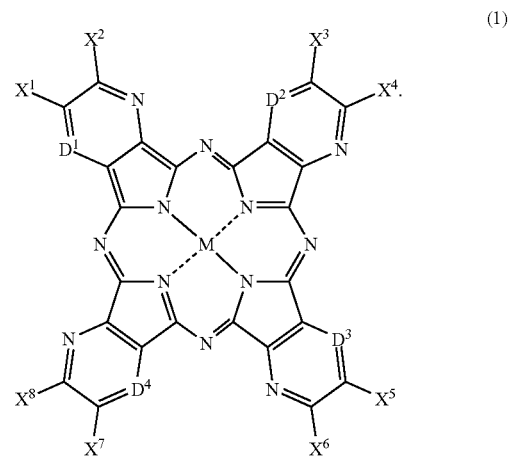

(1)

in formula (1), $X^1$ to $X^8$ each independently represent a hydrogen atom or a halogen atom, $D^1$ to $D^4$ each represent a nitrogen atom or a carbon atom wherein the carbon atom has bound thereto a hydrogen atom or a halogen atom, and M represents an iron atom.

2. The catalyst according to claim 1, wherein a proportion of the metal complex is 75% by mass or less with respect to a total of 100% by mass of the metal complex and the carbon material.

3. The catalyst according to claim 1, wherein the metal complex is a compound represented by formula (2),

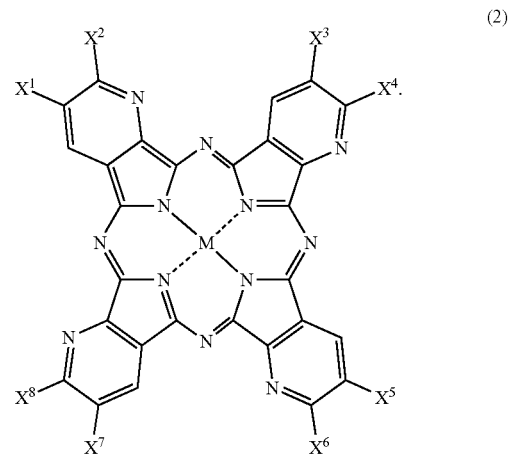

(2)

in formula (2), $X^1$ to $X^8$ each independently represent a hydrogen atom or a halogen atom, and M represents an iron atom.

4. A liquid composition, comprising:
the catalyst according to claim 1; and
a liquid medium.

5. An electrode comprising:
the catalyst according to claim 1.

6. A fuel cell, comprising:
the electrode according to claim 5.

7. An air battery, comprising:
the electrode according to claim 5.

8. A catalyst electrode for electrochemical reaction, comprising:
the catalyst according to claim 1.

* * * * *